(12) United States Patent
Koppala et al.

(10) Patent No.: US 6,275,903 B1
(45) Date of Patent: Aug. 14, 2001

(54) STACK CACHE MISS HANDLING

(75) Inventors: Sailendra Koppala, Mountain View; Ravinandan R. Buchamwandla, Sunnyvale, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/064,686

(22) Filed: Apr. 22, 1998

(51) Int. Cl.[7] .................................................. G06F 12/08
(52) U.S. Cl. ............................ 711/132; 711/126; 712/219
(58) Field of Search .................................. 711/126, 132; 712/219

(56) References Cited

U.S. PATENT DOCUMENTS

| 3,810,117 | 5/1974 | Healey | 711/3 |
| 3,878,513 | 4/1975 | Werner | 711/154 |

(List continued on next page.)

OTHER PUBLICATIONS

Philip Burnley, "CPU architecture for realtime VME systems," Microprocessors & Microsystems, Butterworth & Co. Ltd. (London, Great Britain), (Apr. 12, 1988), pp. 153–158.

Timothy J. Stanley, Robert G. Wedig, "A Performance Analysis of Automatically Managed Top of Stack Buffers," 14th Annual Int'l. Symposium on Computer Architecture, The Computer Society of the IEEE (Pittsburgh, Pennsylvania), (Jun. 2, 1987), pp. 272–281.

Russell R. Atkinson, Edward M. McCreight, "The Dragon Processor," Xerox Palo Alto Research Center, The Computer Society of the IEEE, Oct. 1987; pp 65–69.

"Up pops a 32bit stack microprocessor," Electronic Engineering, (Jun., 1989); p. 79.

Lanfranco Lopricre, "Line fetch/prefetch in a stack cache memory," Microprossors and Microsystems, Butterworth–Heinemann ltd., vol. 17 (No. 9), (Nov., 1993).

Microsoft Press Computer Dictionary, 2nd Ed., p. 279, 1994.

*Primary Examiner*—Reginald G. Bragdon
(74) *Attorney, Agent, or Firm*—Gunnison, Mckay & Hodgson, L.L.P.; Philip J. McKay

(57) ABSTRACT

An instruction pipeline is provided which can handle stack cache misses without stalling. The instruction pipeline includes a stack cache fetch stage configured to retrieve data from a stack cache and a data cache fetch stage configured to retrieve data from a data cache. The instruction pipeline writes data out during a write stage that occurs at the end of the instruction pipeline. Thus, instead of stalling on a stack cache miss, the instruction pipeline can continue processing and issuing a data cache request in the data cache fetch stage for the required data. In addition, some embodiments of the invention include a feedback path between the stack cache fetch stage and pipeline stages following the stack cache fetch stage. If the stack cache fetch stage requires data from an address that is also being used by a later pipeline stage, the data in the later pipeline stage is sent to the stack cache fetch stage through the feedback path.

6 Claims, 29 Drawing Sheets

U.S. PATENT DOCUMENTS

| | | | |
|---|---|---|---|
| 3,889,243 | 6/1975 | Drimak | 711/132 |
| 3,924,245 | 12/1975 | Eaton et al. | 711/219 |
| 4,268,903 | 5/1981 | Miki et al. | 711/220 |
| 4,354,232 | 10/1982 | Ryan | 711/118 |
| 4,375,678 | 3/1983 | Krebs, Jr. | 365/189.04 |
| 4,524,416 | 6/1985 | Stanley et al. | 711/200 |
| 4,530,049 | 7/1985 | Zee | 711/132 |
| 4,600,986 | 7/1986 | Scheuneman et al. | 711/169 |
| 4,674,032 | 6/1987 | Michaelson | 711/169 |
| 4,724,518 | 2/1988 | Steps | 711/127 |
| 4,736,293 | 4/1988 | Patrick | 711/128 |
| 4,761,733 | 8/1988 | McCrocklin et al. | 711/212 |
| 4,811,208 | 3/1989 | Myers et al. | 711/132 |
| 4,951,194 | 8/1990 | Bradley et al. | 711/132 |
| 4,959,771 | 9/1990 | Ardini, Jr. et al. | 711/136 |
| 5,043,870 | 8/1991 | Ditzel et al. | 711/132 |
| 5,093,777 | 3/1992 | Ryan | 711/3 |
| 5,107,457 | 4/1992 | Hayes et al. | 711/132 |
| 5,142,635 | 8/1992 | Saini | 712/225 |
| 5,157,777 | 10/1992 | Lai et al. | 711/202 |
| 5,172,379 | 12/1992 | Burrer et al. | 714/767 |
| 5,210,874 | 5/1993 | Karger | 709/304 |
| 5,226,169 | 7/1993 | Gregor | 711/113 |
| 5,247,644 | 9/1993 | Johnson et al. | 711/157 |
| 5,295,252 | 3/1994 | Torii et al. | 711/127 |
| 5,379,396 | 1/1995 | Gochman et al. | 711/141 |
| 5,463,759 | 10/1995 | Ghosh et al. | 711/134 |
| 5,485,572 | 1/1996 | Overley | 714/21 |
| 5,517,660 | 5/1996 | Rosich | 711/117 |
| 5,535,350 | 7/1996 | Maemura | 711/3 |
| 5,559,986 | 9/1996 | Alpert et al. | 711/144 |
| 5,584,009 | 12/1996 | Garibay, Jr. et al. | 711/117 |
| 5,603,006 | 2/1997 | Satake et al. | 711/132 |
| 5,634,027 | 5/1997 | Saito | 711/3 |
| 5,636,362 | 6/1997 | Stone et al. | 711/129 |
| 5,687,336 | 11/1997 | Shen et al. | 712/202 |
| 5,784,553 | 7/1998 | Kolawa et al. | 714/38 |
| 5,893,121 * | 4/1999 | Ebrahim et al. | 711/132 |
| 5,903,910 * | 5/1999 | Tran et al. | 711/132 |
| 5,925,123 * | 7/1999 | Tremblay et al. | 712/212 |
| 5,930,820 * | 7/1999 | Lynch | 711/132 |
| 5,931,942 * | 8/1999 | Sugimoto | 712/219 |

\* cited by examiner

STACK CACHE MISS HANDLING

CROSS-REFERENCE TO RELATED APPLICATIONS

This application relates to the co-pending application Ser. No. 09/064,807, filed Apr. 22, 1998, "SUPERSCALAR STACK BASED COMPUTING SYSTEM", by Koppala, et. al. owned by the assignee of this application and incorporated herein by reference.

This application relates to the co-pending application Ser. No. 09/064,642, filed Apr. 22, 1998, "REISSUE LOGIC FOR HANDLING TRAPS IN A MULTIISSUE STACK BASED COMPUTING SYSTEM", by Koppala, et. al., now U.S. Pat. No. 6,108,768, owned by the assignee of this application and incorporated herein by reference.

This application relates to the co-pending application Ser. No. 09/064,680, filed Apr. 22, 1998, "LENGTH DECODER FOR VARIABLE LENGTH DATA", by Koppala, et. al., now U.S. Pat. No. 6,170,050, owned by the assignee of this application and incorporated herein by reference.

BACKGROUND OF THE INVENTION

1. Field of the Invention

The present invention relates generally to computing systems and, in particular, to super-scalar stack based computing systems.

2. Discussion of Related Art

Most computing systems are coupled to a random access memory system for storing and retrieving data. Various ways to increase the speed of computing systems using random access memory systems are well known in the art. For example using caches between a central processing unit of a computing system and the memory system can improve memory throughput. Furthermore, super-scalar architectures and pipelining can improve the performance of central processing units.

However, other memory architectures such as stacks are also used in computing systems. As shown in FIG. 1, a stack based computing system 110, which can implement for example, the JAVA Virtual Machine, is coupled to a stack 120. In classical stack architectures, data is either "pushed" onto the stack or "popped" off the stack by stack based computing system 110. For example, to add the numbers 4 and 5, a stack based computing system 110 first pushes the number 4 onto the top of stack 120. Then, stack based computing system 110 pushes the number onto the stack. Then, stack based computing system 110 performs an add operation which pops the number 5 off stack 120 and the number 4 off stack 120 and pushes the number 9 onto the top of stack 120. A major advantage of stack based computing system 110 is that operations using data at the top of the stack do not need to use memory addresses. The top of stack is also referred to as the first location of the stack, and the location just under the top of the stack is also referred to as the second location of the stack. Similarly, the memory location in the stack just after the second location is also referred to as the third location of the stack.

Stack based computing system 110 can become more flexible by also allowing stack based computing system 110 to use some random access techniques with stack 120. Thus, in some implementation of stack based computing system 110 and stack 120, the memory locations in stack 120 are part of a random-access memory architecture. Thus, each memory location in stack 120 has a memory address. As used herein, a memory location having a memory address equal to x is referred to as memory location x.

Even in stack based computing systems using random-access techniques, most operations by the stack based computing system use data from or near the top of stack 120. For example, assume a value V1 from a memory location ADDR1 is to be added to a value V2 from a memory location ADDR2, and the sum stored at a memory location ADDR3, stack based computing system 110 first executes a stack load instruction, which retrieves value V1 from memory location ADDR1 and pushes value V1 onto the top of stack 120. Next, stack based computing system 110 executes another stack load instruction, which retrieves value V2 from memory location ADDR2 and pushes value V2 onto the top of stack 120. Then, stack based computing system 110 executes an add instruction which pops the top two locations of stack 120, which now contain value V1 and value V2, and pushes the sum of value V1 and value V2 onto the top of stack 120. Finally, stack based computing system 110 executes a stack store instruction which pops the value from the top of stack 120, i.e. the sum of value V1 and value V2, and stores the value in memory location ADDR3.

Some of the techniques used to improve the performance of random access memory systems can be adapted to improve stack performance. For example, as shown in FIG. 2, stack 120 can contain a data cache 210, a stack cache 220, a stack cache management unit 240, and a memory circuit 230. Data cache 210 is formed with fast memory circuits, such as SRAMS, to improve the throughput of memory circuit 230. Stack cache 220 specifically caches a top portion of stack 120 using fast memory circuits, such as SRAMS. Stack cache management unit 240 manages stack cache 220 by copying data from memory circuit 230 into stack cache 220 as data is popped off of stack 120 or spilling data from stack cache 220 to memory circuit 230 as data is pushed onto stack 120. Thus, stack cache 220 maintains the top of stack 120 in fast memory circuit, so that a stack based computing system can perform stack operations with low stack latency. Specific implementations of stack caches and stack management units are described in U.S. patent application Ser. No. 08/828,899, entitled "Stack Caching Circuit with Overflow/Underflow unit", by Sailendra Koppala, now U.S. Pat. No. 6,167,400, which is hereby incorporated by reference.

Once stack latency is reduced, the operating speed of a stack based computing system may be limited by the rate at which stack operations can be performed. In general-purpose processing units, such as RISC microprocessors, pipelining and super-scalar implementation are used to improve the performance of the processing units. However, the techniques used for RISC processors are not easily adapted to stack based computing systems. For example, in super-scalar architectures, data dependencies determine which instructions can be issued simultaneously. However, for stack based computing systems, most stack operations use the top of the stack and would thus have a data dependency conflict. Hence, there is a need for a stack based computing system architecture to improve the performance of stack based computing systems.

SUMMARY

Accordingly, the present invention provides pipelining techniques to prevent pipeline stalls and a super-scalar architecture for stack based computing systems, which can issue multiple stack operations concurrently. In accordance with one embodiment of the present invention, a stack based computing system includes an instruction pipeline, which prevents many common causes of pipeline stalls. Specifically, one embodiment of the instruction pipeline includes a stack cache fetch stage to retrieve data from a stack cache and a data cache fetch stage to retrieve data from a data cache. If a stack cache miss occurs, instead of stalling, the instruction pipeline requests the data from the data cache in the data cache fetch stage. Data is not written out until a write stage of the instruction pipeline, as opposed to the execution stage in conventional pipelines.

The instruction pipeline can be modified to reduce data coherency problems in accordance with another embodiment of the present invention. Specifically, a feedback path is coupled between the stack cache fetch stage and pipeline stages following the stack cache fetch stage, such as the data cache fetch stage, the write stage, and the execution stage. A comparator is also coupled between to the stack cache fetch stage and the stages following the stack cache fetch stage. If an address of a data request in the stack cache fetch stage matches the address of any data words in the stages following the stack cache fetch stage, the matching data word is fed to the stack cache fetch stage through the feedback path. Using the feedback path removes potential write after read hazards.

In addition to improving pipeline throughput, embodiments of the present invention can provide super-scalar operation of stack based computing systems. In accordance to one embodiment of the present invention, the instructions of a stack based computing system are separated into different instruction types. Common types include the load variable (LV) type, the store variable (SV) type, the operation (OP) type, the break group one (BG1) type, the break group two (BG2) type, and the non-foldable (NF) type. If instructions of various types occur in specific sequences, the instructions can form an instruction group, so that the instructions in the group can be executed concurrently. Common instruction groups include the LV-SV, LV-OP-SV, LV-OP, LV-LV-OP, LV-LV-OP-SV, LV-BG1, LV-BG2, LV-LV-BG2, and OP-SV instruction groups.

To create and process the instruction groups, an execution unit includes an instruction folding unit configured to combine the instructions into instruction groups and an instruction pipeline configured to execute the instructions and the instruction groups. The instruction pipeline is typically coupled to an instruction buffer, which stores the next few instructions that are to be executed. Some embodiments also include an instruction cache.

The instruction folding unit includes an instruction type estimator, an instruction type selector and a folding logic circuit. The instruction type estimator quickly estimates the instruction types of the instructions in the instruction buffer. The instruction type selector selects the actual instruction types from the estimates made by the instruction type estimator. The folding logic circuit decodes the instruction types into instruction groups.

For stack based computing systems with variable length instructions, a length decoder is used to decode the lengths of the instructions and instruction groups. In one embodiment of the present invention, a length decoder includes a length estimator and a length selector. The length estimator estimates the length of potential instruction groups by adding an offset value to instructions from the instruction buffer. The length selector selects the actual length of the instruction group from the estimates made by the length estimator.

While executing instruction groups, one or more of the instructions within the instruction group may contain a problem that prevents execution of the instruction group. In conventional systems, individual instructions that cause problems are trapped using conventional trap logic. In accordance with one embodiment of the present invention when an instruction group is trapped, a reissue logic causes each instruction of the instruction group to be reissued as an individual instruction. Thus, conventional trap logic circuits can be used to handle the problems caused by the instructions.

Specifically, in one embodiment an execution unit includes an instruction pipeline, an instruction folding unit, and reissue logic. When an instruction group is trapped, the reissue logic restores the program state of the execution unit prior to issuance of the instruction group. The reissue logic inhibits folding of instructions into instruction groups by the instruction folding unit. After the instructions of the trapped instruction group have executed, the reissue logic enables folding again.

Thus, the present invention improves the performance of stack based computing systems by avoiding pipeline stalls and processing instructions concurrently in instruction groups. The present invention will be more fully understood in view of the following description and drawings.

DETAILED DESCRIPTION

According to the principles of this invention, certain limitations imposed by conventional stack based computing systems have been overcome. The present invention provides a pipelined multi-issue stack based computing architecture so that multiple stack operations can be performed as a single instruction group to improve the performance of a stack based computing system. The architecture includes a novel instruction grouping technique, length decoder, and reissue logic. Furthermore, a novel cache utilization approach can further minimize the delays caused by stack latencies.

PIPELINE ENHANCEMENTS

Figure 1:
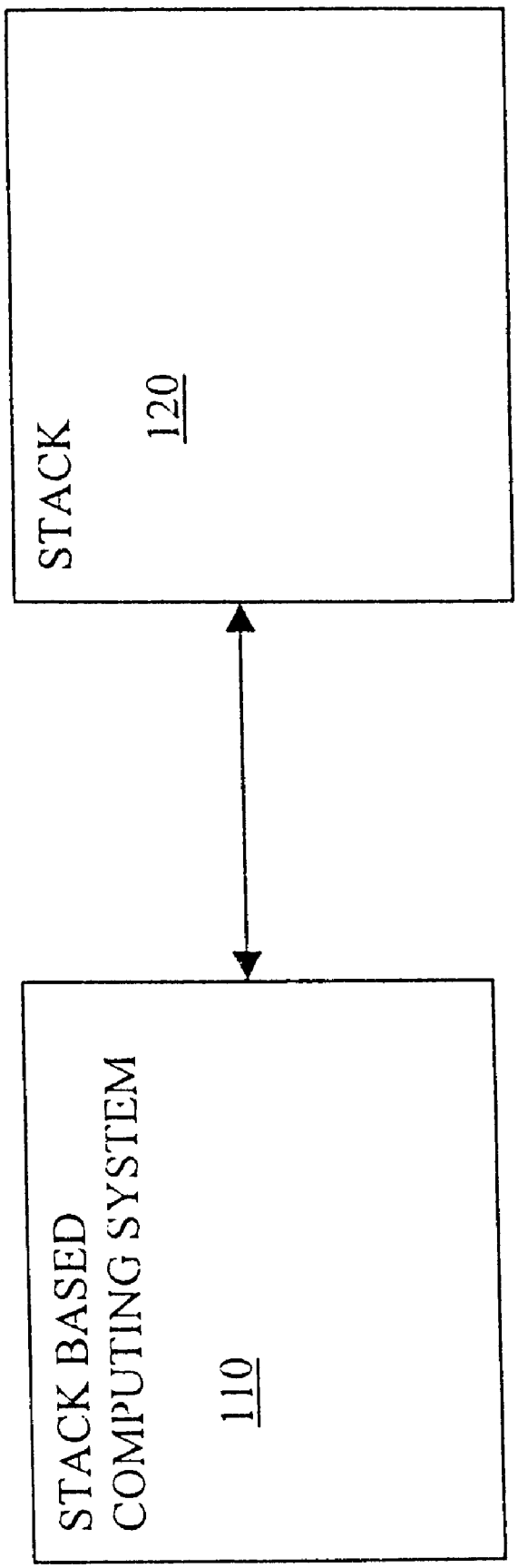
FIG. 1 is a block diagram of a stack-based computing system with a stack memory.
Figure 2:
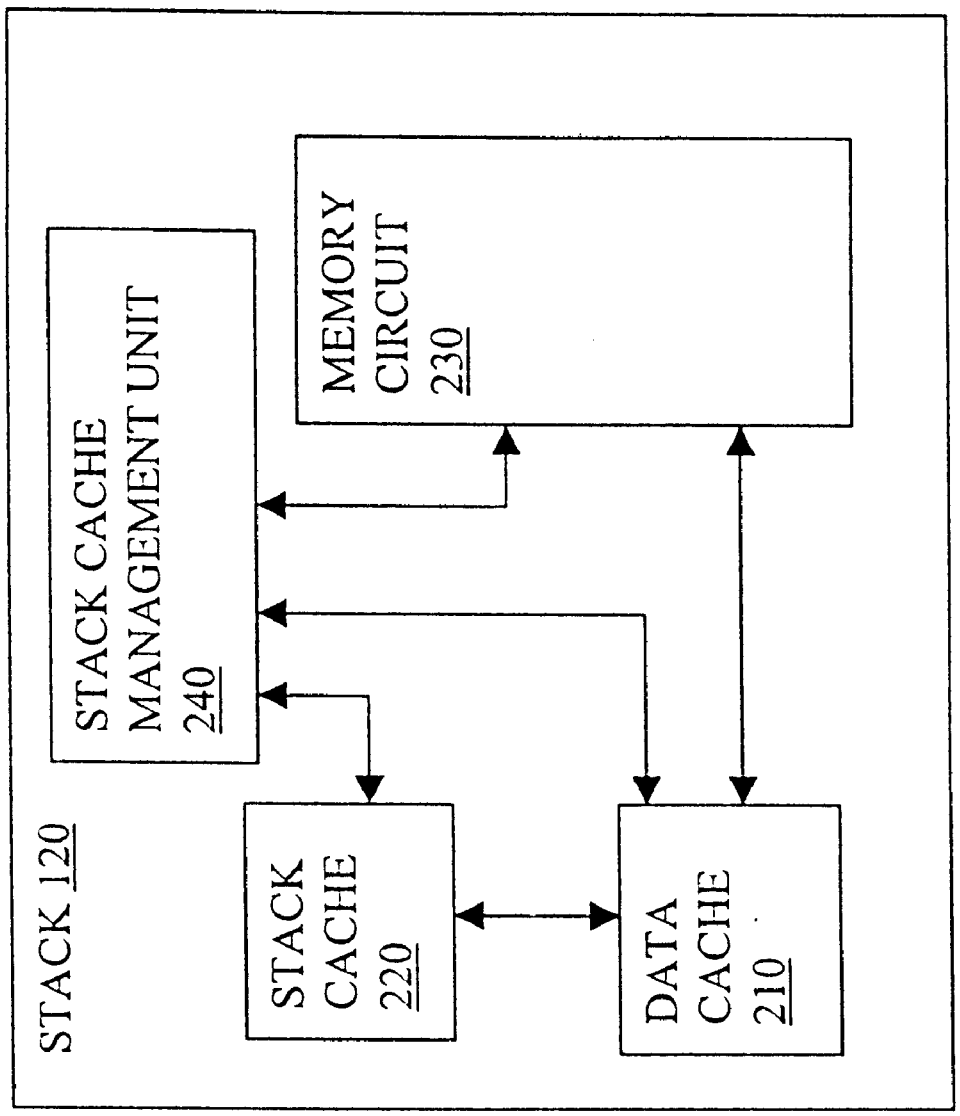
FIG. 2 is a block diagram of a memory architecture to improve the performance of a stack.
Figure 3:
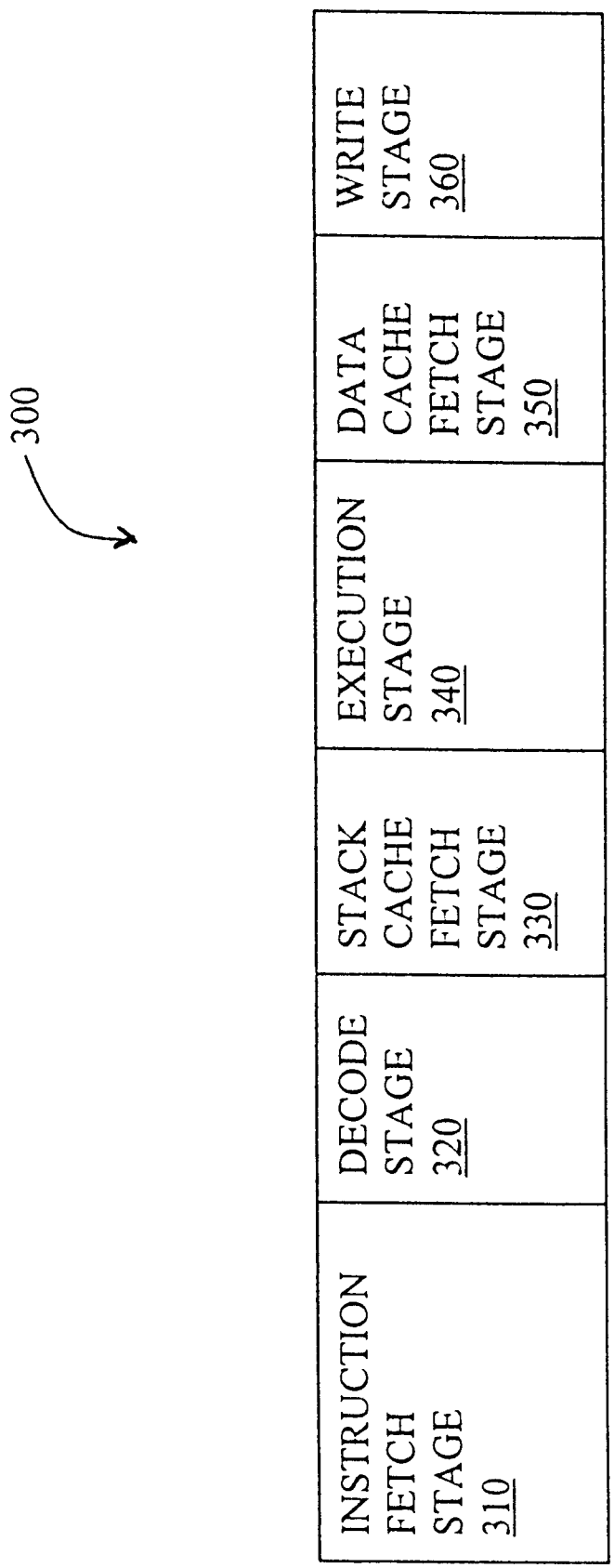
FIG. 3 is a block diagram of an instruction pipeline to improve the performance of a stack based computing system in accordance with one embodiment of the present invention.

FIG. 3 shows an instruction pipeline 300 in accordance with one embodiment of the present invention. Instruction pipeline 300 includes an instruction fetch stage 310, a decode stage 320, a stack cache fetch stage 330, an execute stage 340, a data cache fetch stage 350 and a write stage 360. Instruction pipeline 300 is designed to use the memory architecture of FIG. 2. Some embodiments of instruction pipeline 300 are coupled to an instruction cache and an instruction buffer (e.g. FIG. 19).

In conventional pipelines values are written to memory in an execution stage. Therefore, if an instruction requests a value from a memory location that is not cached, the pipeline must stall the instruction in the operand fetch stage until the requested value is retrieved from memory circuit 230. For example, assume an integer stack load instruction requesting the value in a memory location ADDR1 (i.e. ILOAD(ADDR1)) placed on the top of the stack is executed. If memory location ADDR1 is cached, then the integer stack load instruction can be executed without stalling the pipeline. However, if memory location ADDR1 is not cached the pipeline must stall while the value is retrieved from memory circuit 230 so that the value can be written in the execution stage.

According to the principles of one embodiment of the present invention, instruction pipeline 300 is modified to minimize the occurrences of pipeline stalls. Specifically, in instruction pipeline 300 data is written out or pushed onto stack 120 in write stage 360, rather than execute stage 340. If a read stack cache miss, i.e. if the stack based computing system attempts retrieve data from a memory location that is not cached in the stack cache 220, occurs in stack cache fetch stage 330, instruction pipeline 300 does not stall because the data is not required until write stage 360. Instead, the load request is sent to data cache 210. If data cache 210 has cached the requested memory location, instruction pipeline 300 retrieves the requested data in data cache fetch stage 350. The data can then be written out or pushed onto the top of stack 120 in write stage 360. However, if the requested memory location is not cached in either stack cache 220 or data cache 210, instruction pipeline 300 must stall until the data from the requested memory location can be retrieved from memory circuit 230.

During write instructions, data cache fetch stage 350 determines whether a write data cache miss, i.e. if the stack based computing system attempts to write data to a memory location that is not cached in data cache 210, occurs. If a data cache write miss occurs, the current data is sent to stack cache management unit 240 in write stage 360. The stack cache management unit of U.S. Pat. No. 6,167,488 already handles transfer of data between stack cache 220, data cache 210, and memory circuit 230. Thus, stack cache management unit 240 can store the current data word in memory circuit 230 or data cache 210. In some embodiments of stack cache management unit 240, a data cache write miss causes an interrupt to stack cache management unit 240, which suspends overflow and underflow processing of stack cache 220 until after the current data word is stored in memory circuit 230 or data cache 210.

Figure 4:
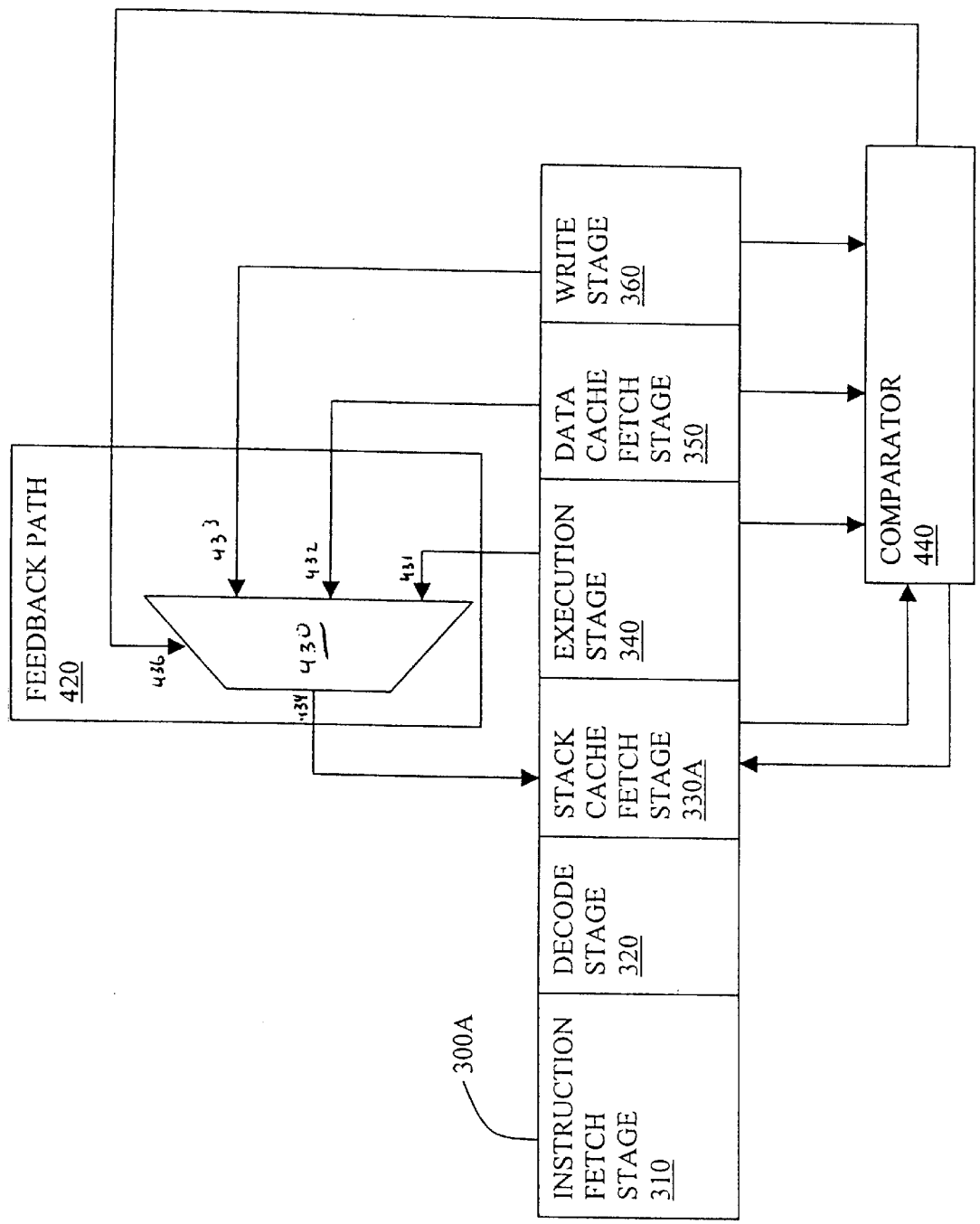
FIG. 4 is a block diagram of an instruction pipeline with a feedback to improve the performance of a stack based computing system in accordance with one embodiment of the present invention.

FIG. 4 shows an instruction pipeline 300A in accordance with another embodiment of the present invention. Instruction pipeline 300A has a modified stack cache fetch stage 330A, which is adapted to receive data from a feedback path 420. Furthermore, any data values in execution stage 340, data cache fetch stage 350, and data write stage 360 are coupled to feedback path 420. In addition, the memory addresses used in any instructions in stack cache fetch stage 330A, execution stage 340, data cache fetch stage 350, and write stage 360 are coupled to a comparator 440. Comparator 440 compares the memory address of the instruction in stack cache fetch stage 330A against the memory addresses of the instructions in execute stage 340, data cache fetch stage 350, and write stage 360. Comparator 440 signals stack cache fetch stage 330A if a match occurs and controls feedback path 420 to output the data value from the pipeline stage with the matching address. Thus, for example, if the memory address from the instruction in stack cache fetch stage 330A matches the memory address from the instruction in data cache stage 350, comparator 440 signals stack cache fetch stage 330A that a match occurred and controls feedback path 420 to output the data value from data cache fetch stage 350.

In one embodiment of the present invention, feedback path 420 comprises a multiplexer 430 with three sets of input terminals 431, 432, and 433, one set of output terminals 434 and one set of control terminals 436. Input terminals 431 are coupled to execution stage 340, input terminals 432 are coupled to data cache fetch stage 350, and input terminals 433 are coupled to write stage 360. Output terminals 434 are coupled to stack cache fetch stage 330A. Control terminals 436 are coupled to comparator 440. In another embodiment of the present invention, feedback path 420 comprises multiple single output multiplexers under control of comparator 440.

If the instruction in stack cache stage 330A requests a data value from a memory address and comparator 440 indicates the memory address matches a memory address in the other pipeline stages, stack cache fetch stage 330A retrieves the data value from feedback path 420 instead of attempting to retrieve the data value from stack cache 220. If the memory address from the instruction in stack cache fetch stage 330A does not match the memory addresses from the instructions in the other pipeline stages, stack cache fetch stage 330A performs as described above with respect to stack cache fetch stage 330. For instructions that do not request data values from memory, feedback path 420 and comparator 440 are not used by stack cache fetch stage 330A.

Use of feedback path 420 and comparator 440 prevents potential data coherency problems. For example, if the instruction in stack cache stage 330A requests a data value from memory location ADDR1 while an instruction in data cache fetch stage 350 contains a value to be stored in memory location ADDR1, stack cache fetch stage 330A may retrieve an invalid value from stack cache 220. By retrieving the data value from data cache fetch stage 350 through feedback path 420, a write after read data coherency hazard is eliminated. Furthermore, if memory location ADDR1 is not cached, retrieving the data value from data cache fetch stage 350 avoids a pipeline stall because instruction pipeline 300A does not have to wait on a memory request to memory circuit 230.

Thus, instruction pipelines in accordance with embodiments of the present invention reduce the likelihood of pipeline stalls by utilizing both stack cache 220 and data cache 210. Furthermore, the addition of feedback path 420 and comparator 440 eliminates many potential data coherency problems, as well as preventing some types of pipeline stalls. Thus, instruction pipelines in accordance with embodiments of the present invention can greatly increase the performance of stack based computing systems.

SUPER-SCALAR OPERATION

A common technique to improve performance in random access memory computing systems is to execute multiple instructions simultaneously. Generally, in random access memory computing systems, data dependencies are a major factor in whether instructions can be executed simultaneously. However, as explained above, in stack based computing systems, most instructions use data from the top of the stack or pushes data onto the top of the stack. Thus, most instructions in a stack based computing system have data dependencies that would prevent executing multiple instructions simultaneously in the way that super-scalar random access memory computing systems execute multiple instructions.

However, a stack based computing system in accordance with one embodiment of the present invention can group subsets of instructions together for concurrent execution. Specifically, according to the principles of an embodiment of the present invention, the instructions of a stack based computing system are separated into instruction types. Certain sequences of instructions of various instruction types can be executed as a single instruction group. Specifically, if a subset of the instructions form a specific sequence of instruction types, the subset of instructions can be grouped as an instruction group. Thus, the present invention provides super-scalar operation of a stack-based processor.

FIGS. 5(a) through 9(c) illustrate various instruction types. FIGS. 10(a) through 18(f) illustrate instruction groups formed using instructions of specific instruction types. In FIGS. 5(a) to 18(f), instructions and groups are illustrated manipulating data values in memory locations and in stack 120; however, in actual implementation, one or more execution units within a stack-based computing system would manipulate the data when executing the instructions or groups.

Figure 5B:
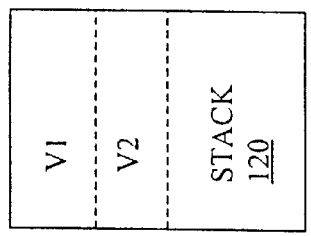
FIGS. 5(a) and 5(b) illustrate the load variable (LV) instruction type in accordance with one embodiment of the present invention.
Figure 5A:
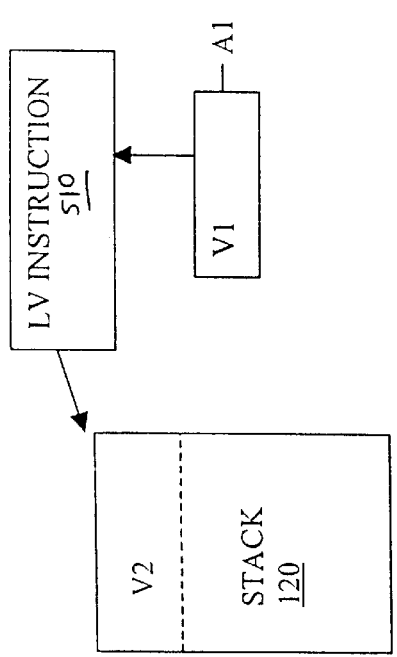

FIGS. 5(a) and 5(b) illustrate the Load Value (LV) instruction type. Instructions of the load value instruction type are referred to as LV instructions. A LV instruction pushes a single value from memory or a register onto the stack. As illustrated in FIG. 5(a) prior to executing a LV instruction 510, stack 120 contains value V2 at the top of stack 120. A LV instruction 510 takes a value V1 from memory location A1 or a register and pushes value V1 onto stack 120. As illustrated in FIG. 5(b), after executing LV instruction 510, stack 120 contains value V1 at the top of stack 120 and value V2 at the second location of stack 120. Typically, memory location A1 retains value V1 as well. The load value instruction type includes instructions, such as integer load (iload), float load (fload), read global register (read_global1), and duplicate the top of stack (DUP).

Figure 6B:
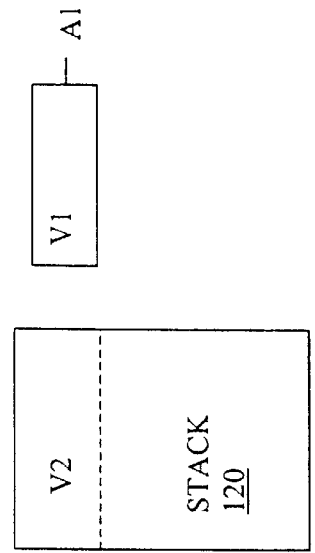
FIGS. 6(a) and 6(b) illustrate the store variable (SV) instruction type in accordance with one embodiment of the present invention.
Figure 6A:
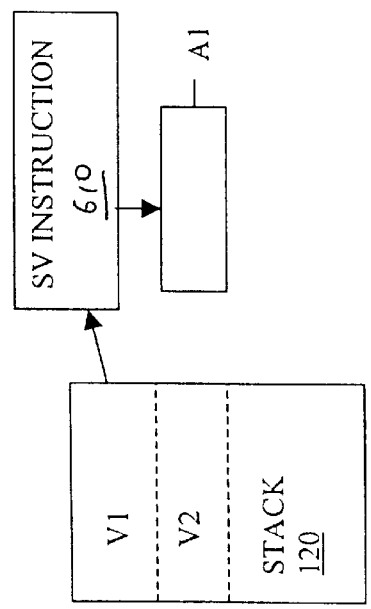

FIGS. 6(a) and 6(b) illustrate the store value (SV) instruction type. Instructions of the store value instruction type are referred to as SV instructions. A SV instruction pops the value at the top of the stack and stores that value into a memory location or register. As illustrated in FIG. 6(a), stack 120 contains value V1 at the top of stack 120 and value V2 in the second location stack 120 prior to execution of a SV instruction 610. SV instruction 610 pops value V1 off of stack 120 and stores value V1 into memory location A1. As illustrated in FIG. 6(b), after execution of SV instruction 610, the top of stack 120 contains value V2 and memory location A1 contains value V1. The store value instruction type includes instructions such as integer store (istore), float store (fstore), and write global register (write_global).

Figure 7A:
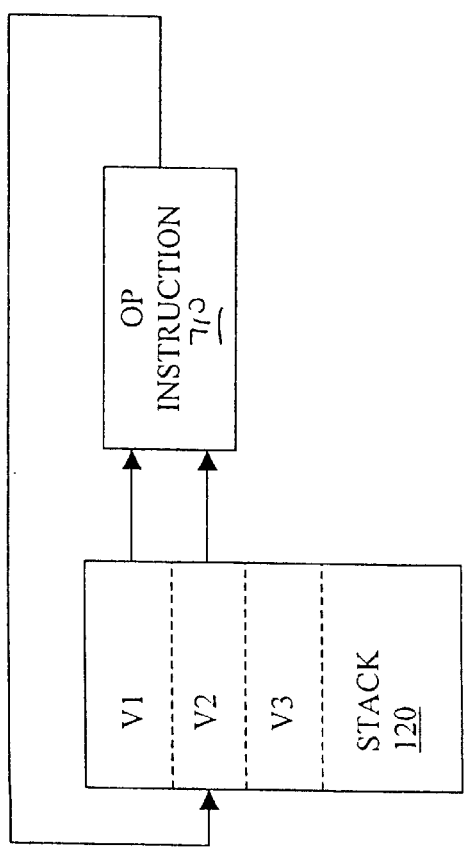
FIGS. 7(a) and 7(b) illustrate the operation (OP) instruction type in accordance with one embodiment of the present invention.
Figure 7B:
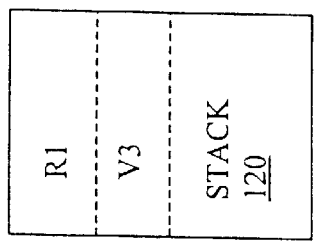

FIGS. 7(a) and 7(b) illustrate the operation (OP) instruction type. Instructions of the operation instruction type are referred to as OP instructions. An OP instruction pops two values from the top of stack 120 and pushes one value back onto stack 120. As illustrated in FIG. 7(a), stack 120 contains values V1, V2, and V3 in the top three locations of stack 120, prior to execution of an OP instruction 710. OP instruction 710 pops value V1 and value V2 off of stack 120, performs the function of OP instruction 710 and pushes a result R1 (FIG. 7(b)) onto stack 120. As illustrated in FIG. 7(b), after execution of OP instruction 710, stack 120 contains result R1 at the top of stack 120 and value V3 in the second location of stack 120. The operation instruction type includes instructions, such as integer add (iadd), fload add (fadd), integer multiply (imult), and float multiply (fmult).

Figure 8C:
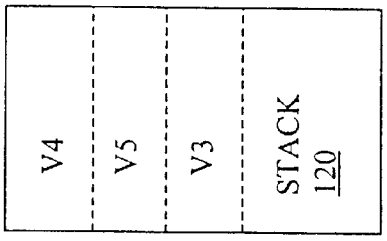
FIG. 8(a), 8(b), and 8(c) illustrate the break group two (BG2) instruction type in accordance with one embodiment of the present invention.
Figure 8B:
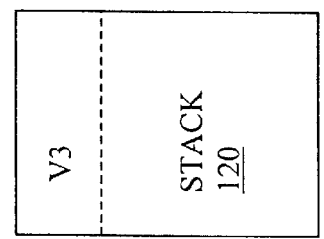
Figure 8A:
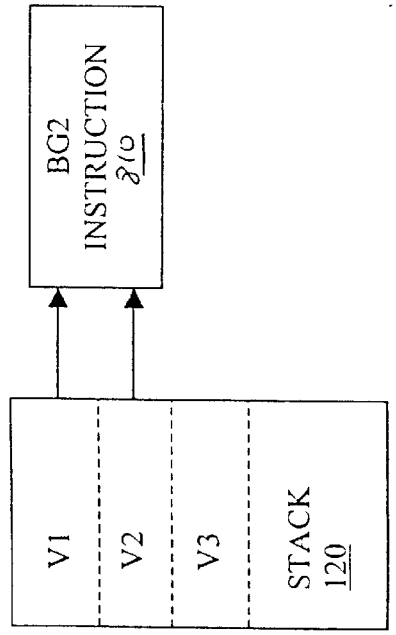

FIGS. 8(a), 8(b), and 8(c) illustrate instructions of the break group two (BG2) instruction type. Instructions of the break group two instruction type are referred to as BG2 instructions. BG2 instructions pop two values off of stack 120 and prevent further grouping of instructions. One reason for preventing further grouping is if the instruction does not push any values onto stack 120. For example, many branching instructions pop and compare the top two value of stack 120 but do not push any values onto stack 120. Another reason for preventing further grouping of instructions occurs if the instruction requires additional time to complete. The additional time necessary prevents grouping of additional instructions because the execution unit may be able to work on other instructions while the BG2 instruction is being processed. For example, in some embodiments, load character from an array (caload), which pops two values from stack 120 and eventually returns a character onto stack 120, is implemented with microcode. Since microcode operation is much slower than a hardware implementation, load character from an array is of the BG2 instruction type. Another reason for preventing further grouping occurs if the instruction pushes multiple values onto the stack. For example, the swap command swaps the top two locations of the stack.

As illustrated in FIG. 8(a), stack 120 contains values V1, V2, and V3 in the top three locations of stack 120, prior to execution of a BG2 instruction 810. BG2 instruction 810 pops value V1 and value V2 off of stack 120. As illustrated in FIG. 8(b), after execution of BG2 instruction 810, stack 120 typically contains value V3 at the top of stack 120. However for BG2 instructions which push two values onto stack 120, stack 120 may contain value V4 at the top of stack 120, value V5 in the second location of stack 120, and value V3 in the third location of stack 120, as illustrated in FIG. 8(c). For the swap instruction value V5 would equal value V1 and value V4 would equal value V2.

Figure 9B:
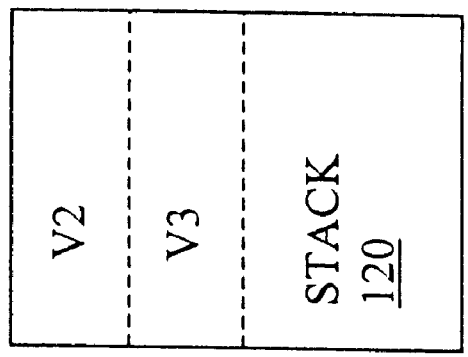
FIGS. 9(a), and 9(b) illustrate the break group one (BG1) instruction type in accordance with one embodiment of the present invention.
Figure 9A:
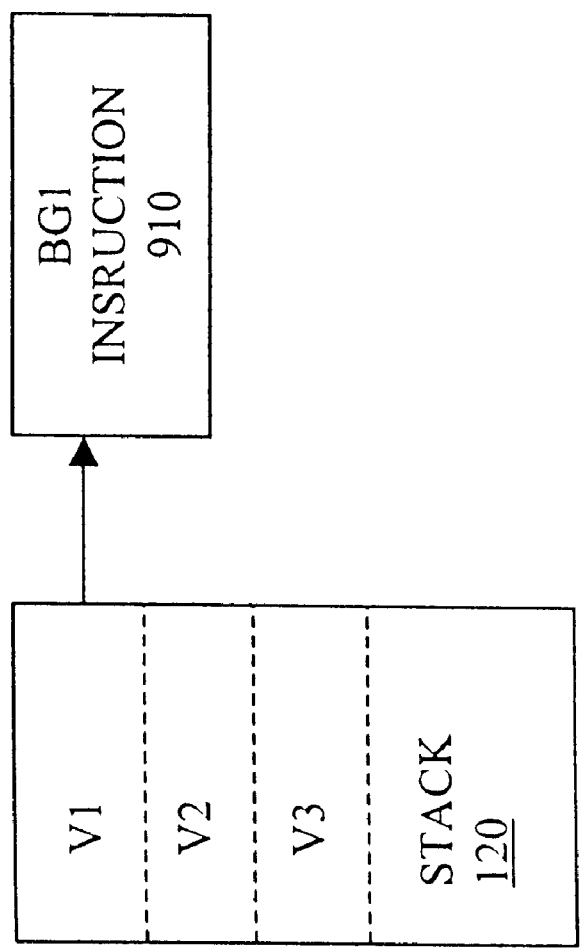

FIGS. 9(a), and 9(b) illustrate instructions of the break group one (BG1) instruction type. Instructions of the break group one instruction type are referred to as BG1 instructions. BG1 instructions pop one value off of stack 120 and prevent further grouping of instructions. One reason for preventing further grouping is if the instruction does not push any values onto stack 120. For example, some branching instructions pop and compare the top value of stack 120 against null but do not push any values onto stack 120. Another reason for preventing further grouping of instructions occurs if the instruction requires additional time to complete.

As illustrated in FIG. 9(a), stack 120 contains values V1, V2, and V3 in the top three locations of stack 120, prior to execution of a BG1 instruction 910. BG1 instruction 910 pops value V1 off of stack 120. As illustrated in FIG. 9(b), after execution of BG1 instruction 910, stack 120 typically contains value V2 at the top of stack 120.

Instructions that do not fit into any of the above instruction types can not be executed with other instructions; i.e. these instructions can not be folded with other instructions into instruction groups. The instructions that which can not be executed simultaneously are classified with the non-foldable instruction type and are referred to as NF instructions.

Some embodiments of the present invention may include other instruction types. For example, an operation one operand (OP1) instruction type could include instructions which pop only one value off of stack 120 performs an operation and then push one result back onto stack 120. The OP1 instruction type could include instructions such as float to integer (f2i) or integer to float (i2f).

In accordance with one embodiment of the present invention, a stack based computing system can group and execute multiple instructions concurrently if sequential instructions form certain instruction groups. FIGS. 10(a)–18 (f) illustrate nine different instruction groups. Using the principles described herein, one skilled in the art can form other instruction groups for specific implementations of a stack based computing system. Furthermore, the principles of the present invention are applicable to stack based computing systems, which use only a subset of the nine instruction groups described herein.

Figure 10A:
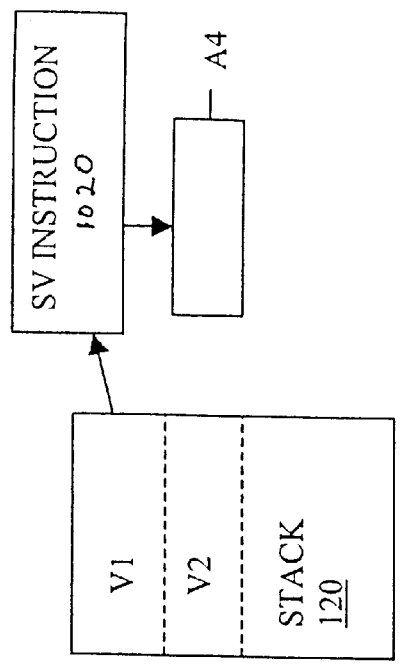
FIGS. 10(a)–10(d) illustrate the LV-SV group of instructions in accordance with one embodiment of the present invention.
Figure 10B:
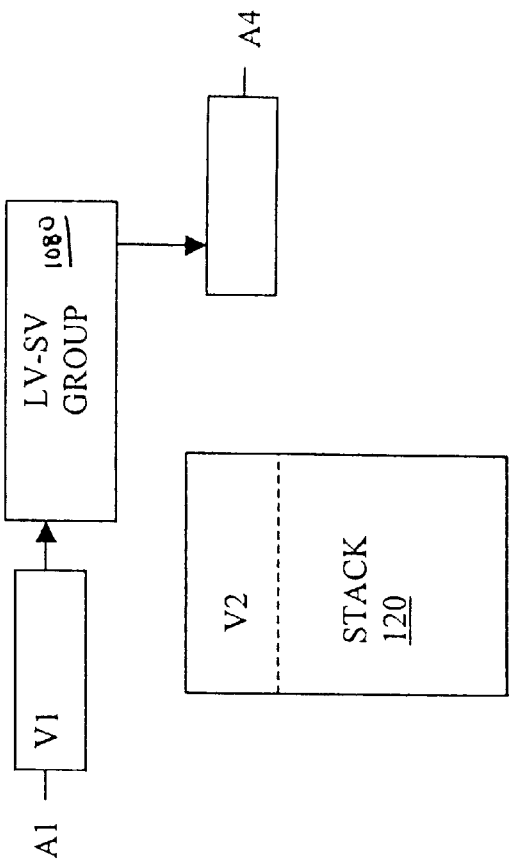
Figure 10C:
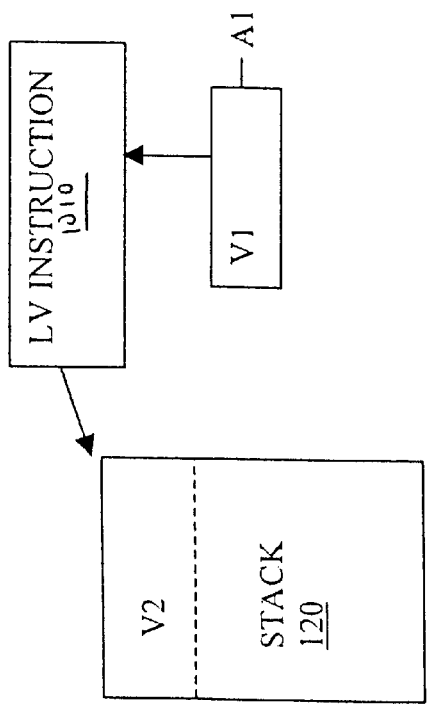
Figure 10D:
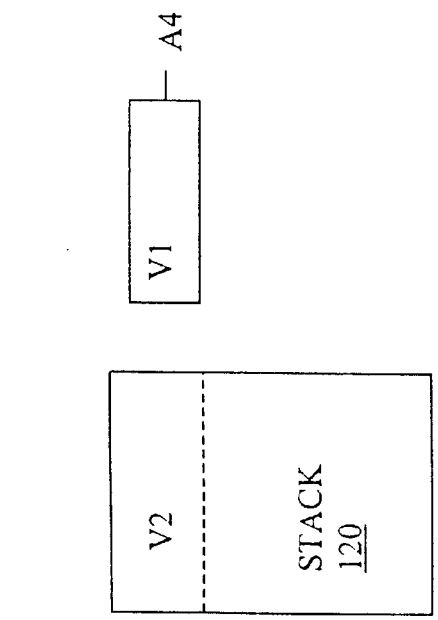

FIGS. 10(a)–10(d) illustrate the LV-SV group, which corresponds to a LV instruction followed by a SV instruction. FIGS. 10(a), 10(b), and 10(c) illustrate how a conventional stack based computing system would process a LV instruction followed by a SV instruction. Specifically, in FIG. 10(a) LV instruction 1010 pushes value V1 onto stack 120 during a first processing cycle. In FIG. 10(b), SV instruction 1020 pops value V1 from the top of stack 120 and stores value V1 into a memory location A4 during a second processing cycle. As illustrated in FIG. 10(c), after the execution of SV instruction 1020, value V2 is at the top of stack 120, and memory location A4 contains value V1. FIG. 10(d) illustrates how a stack based computing system using the principles of the present invention can perform LV instruction 1010 and SV instruction 1020 as a single instruction group during a single processing cycle. Specifically, LV-SV group 1080 retrieves value V1 from memory location A1 and stores value V1 directly into memory location A4 (i.e. without pushing value V1 onto stack 120). After LV-SV group 1080 is executed, value V2 is at the top of stack 120, and memory location A4 contains value V1, as illustrated in FIG. 10(c). Thus, a LV instructions and a SV instruction are performed as a single instruction group instead of sequentially.

Figure 11B:
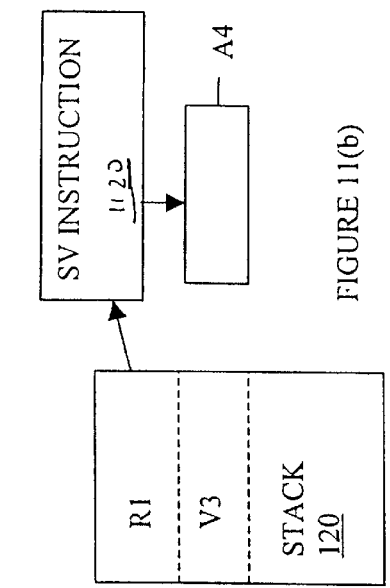
FIG. 11(a)–11(d) illustrate the OP-SV group of instructions in accordance with one embodiment of the present invention.
Figure 11D:
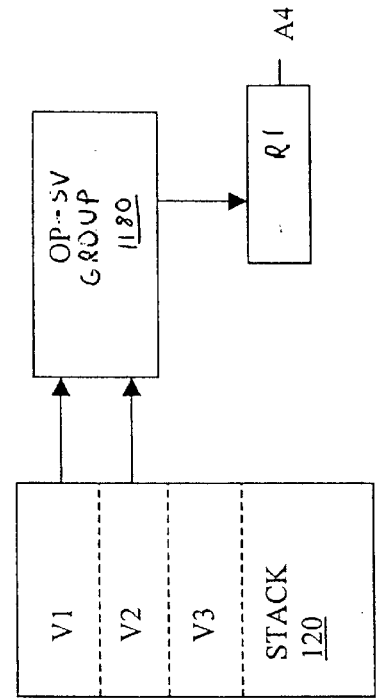
Figure 11A:
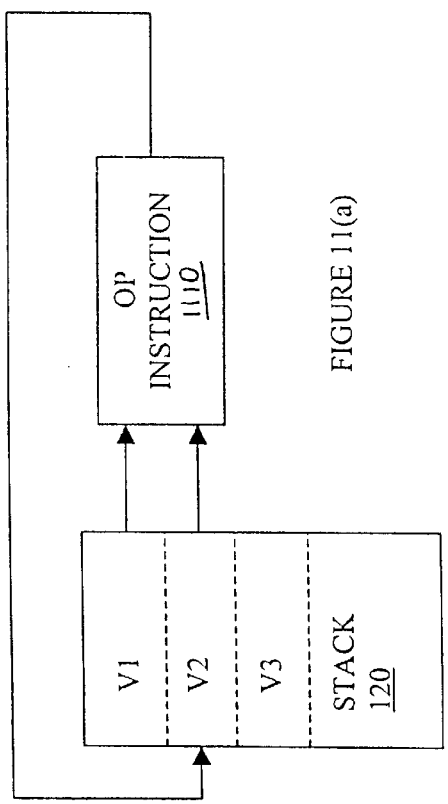
Figure 11C:
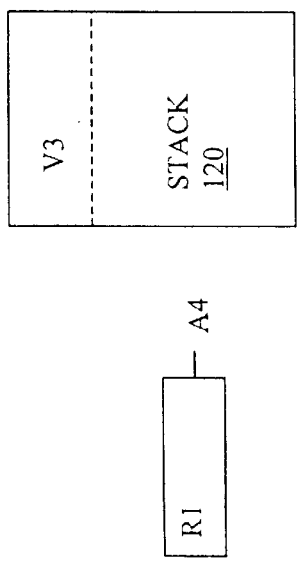

Another instruction group is the OP-SV group. The OP-SV group corresponds to an OP instruction followed by an SV instruction. FIGS. 11(a), 11(b), and 11(c) illustrate how a conventional stack based computing system executes an OP instruction followed by a SV instruction. As illustrated in FIG. 11(a), during a first processing cycle, an OP instruction 1110 pops value V1 and value V2 off of stack 120, performs the function of OP instruction 1110, and pushes result R1 back on stack 120. Then, as illustrated in FIG. 11(b), during a second processing cycle, an SV instruction 1120 pops result R1, which is on top of stack 120, off of stack 120 and stores result R1 into memory location A4. After execution of SV instruction 1120, value V3 is at the top of stack 120 and memory location A4 contains result R1, as illustrated in FIG. 11(c). FIG. 11(d) illustrates how a stack based computing system using the principles of the present invention can perform OP instruction 1110 and SV instruction 1120 as a single instruction group in a single processing cycle. Specifically, OP-SV group 1180 pops value V1 and value V2 off of stack 120, performs the function of OP instruction 1110, and stores result R1 directly into memory location A4 (i.e., without pushing result R1 onto stack 120). After the OP-SV group is executed, value V3 is at the top of stack 120 and result R1 is in memory location A4, as illustrated in FIG. 11(c). Thus, an OP instruction and a SV instruction are performed as a single instruction group instead of sequentially.

Figure 12B:
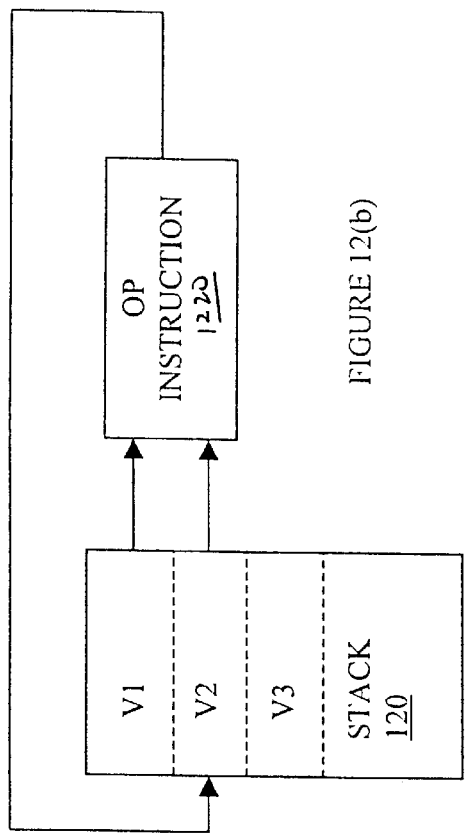
FIGS. 12(a)–12(d) illustrate the LV-OP group of instructions in accordance with one embodiment of the present invention.
Figure 12D:
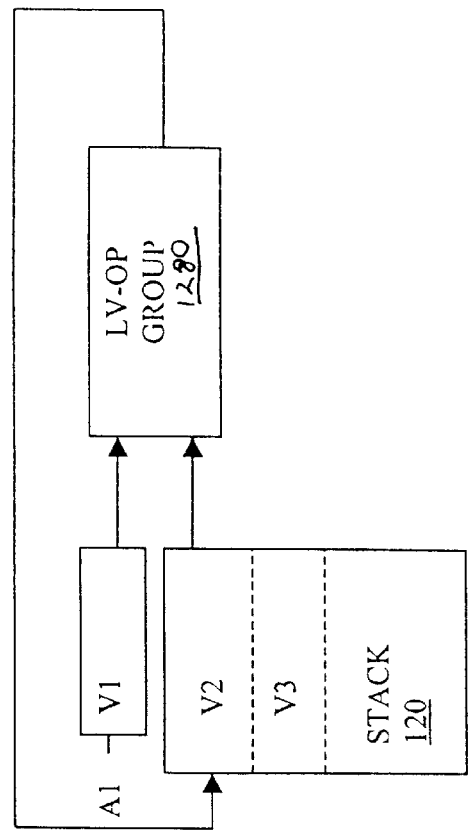
Figure 12A:
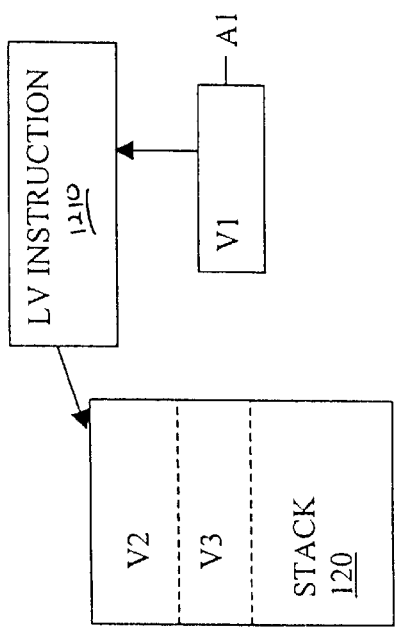
Figure 12C:
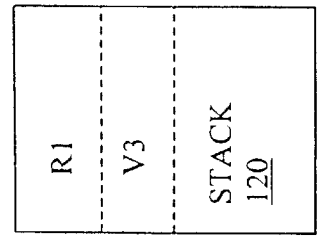

A LV instruction can be combined with an OP instruction to form a LV-OP group. FIGS. 12(a), 12(b), and 12(c) illustrate how a conventional stack based computing system executes a LV instruction followed by an OP instruction. As illustrated in FIG. 12(a), a LV instruction 1210 pushes a value V1 from memory location A1 onto stack 120 during a first processing cycle. Then as illustrated in FIG. 12(b), an OP instruction 1220 pops values V1 and V2 off of stack 120, performs the function of OP instruction 1220, and pushes result R1 back on stack 120 during a second processing cycle. The results of the LV instruction and OP instruction are illustrated in FIG. 12(c) with result R1 on top of stack 120. FIG. 12(d) illustrates how a stack based computing system using the principles of the present invention can perform LV instruction 1210 and OP instruction 1220 as a single instruction group in a single processing cycle. Specifically, LV-OP group 1280 retrieves value V1 from memory location A1 and pops value V2 off of stack 120. LV-OP group 1280 then performs the function of OP instruction 1220 and pushes result R1 (FIG. 12(c)) onto stack 120. After LV-OP group 1280 is executed, results R1 is at the top of stack 120, as illustrated in FIG. 12(c). Thus, a LV instruction and an OP instruction are performed as a single instruction group instead of sequentially.

Figure 13A:
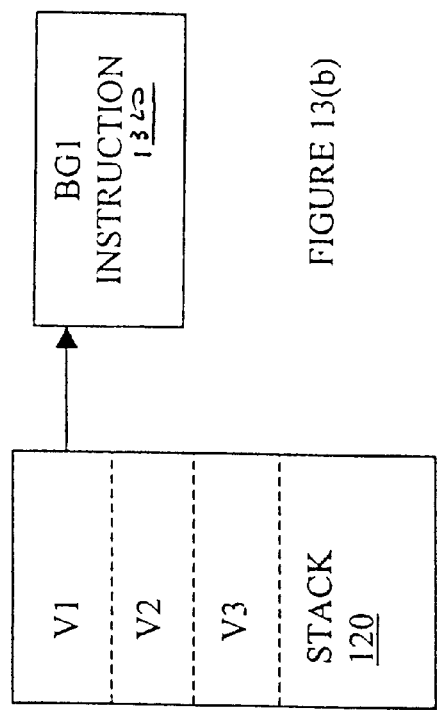
FIGS. 13(a)–13(d) illustrate the LV-BG1 group of instructions in accordance with one embodiment of the present invention.
Figure 13B:
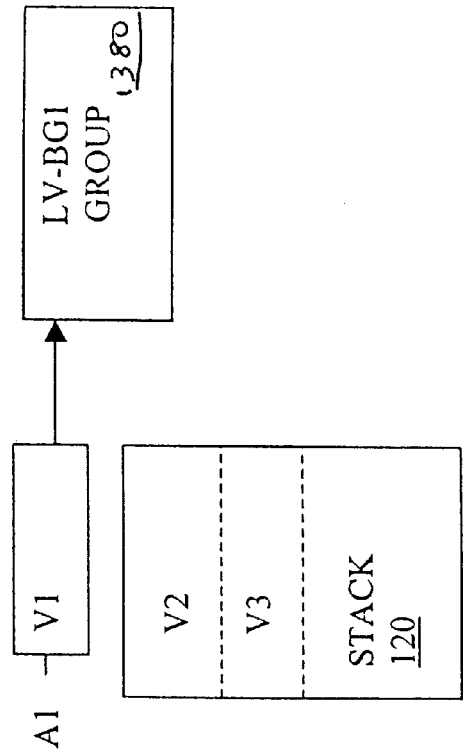
Figure 13C:
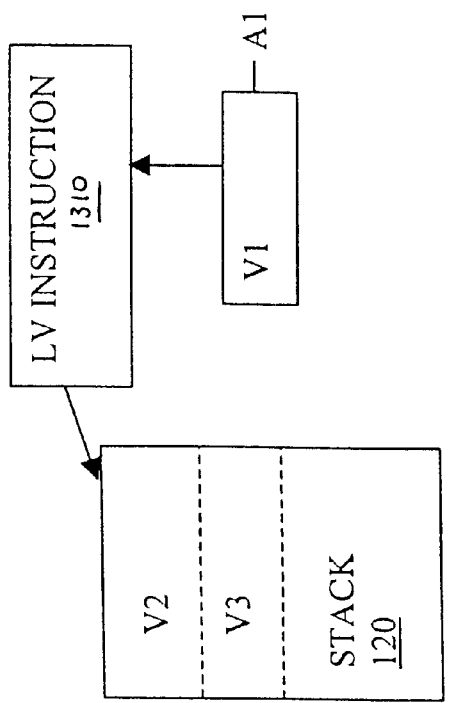
Figure 13D:
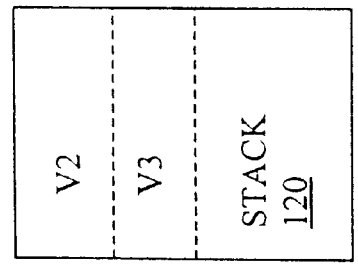

A LV instruction can also be combined with a BG1 instruction to form a LV-BG1 group. FIGS. 13(a), 13(b), and 13(c) illustrate how a conventional stack based computing system executes a LV instruction followed by a BG1 instruction. As illustrated in FIG. 13(a), a LV instruction 1310 pushes a value V1 from memory location A1 onto stack 120 during a first processing cycle. Then as illustrated in FIG. 13(b), a BG1 instruction 1320 pops values V1 off of stack 120 and performs the function of BG1 instruction 1320 during a second processing cycle. The results of the LV instruction and BG1 instruction are illustrated in FIG. 13(c) with value V2 on top of stack 120. FIG. 13(d) illustrates how a stack based computing system using the principles of the present invention can perform LV instruction 1310 and BG1 instruction 1320 as a single instruction group during a single processing cycle. Specifically, LV-BG1 group 1380 retrieves value V1 directly from memory location A1 (i.e., without pushing value V1 onto stack 120) and performs the function of BG1 instruction 1320. After the LV-BG1 group is executed, the top of stack 120 contains value V2, as illustrated in FIG. 13(c). Thus, a LV instruction and a BG1 instruction are performed as a single instruction group instead of sequentially.

Figure 14A:
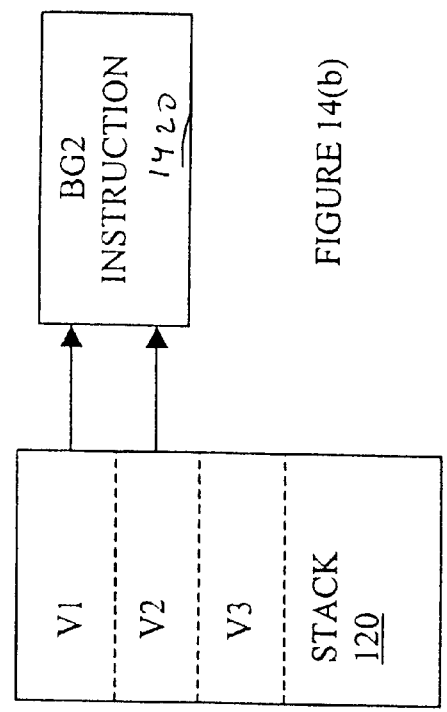
FIGS. 14(a)–14(d) illustrate the LV-BG2 group of instructions in accordance with one embodiment of the present invention.
Figure 14B:
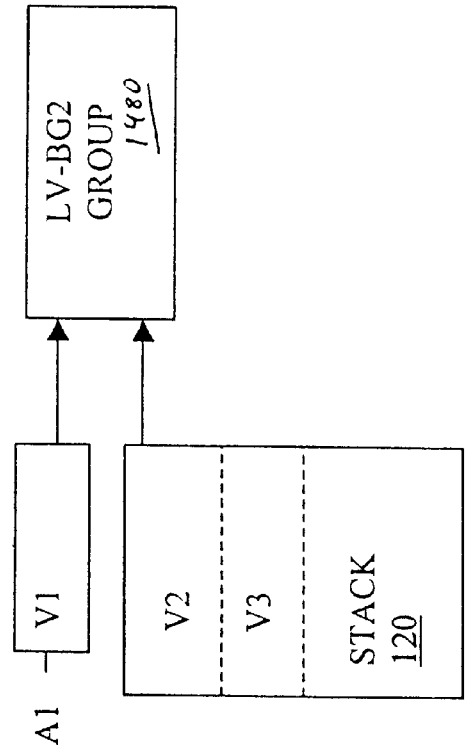
Figure 14C:
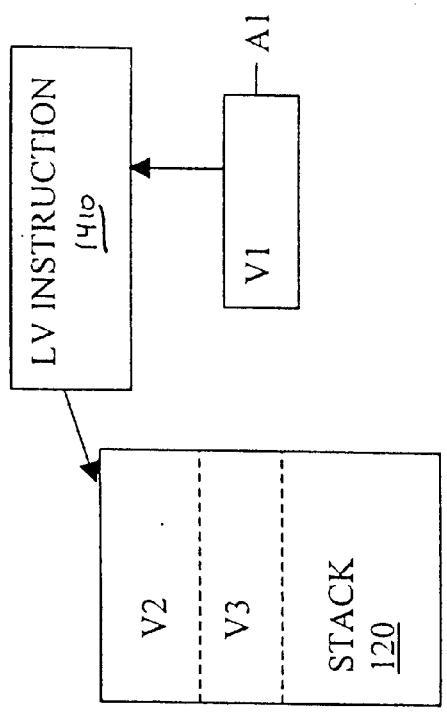
Figure 14D:
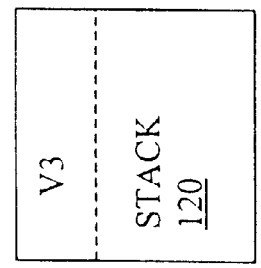

A LV instruction can also be combined with a BG2 instruction to form a LV-BG2 group. As illustrated in FIG. 14(a), a LV instruction 1410 pushes a value V1 from memory location A1 onto stack 120 during a first processing cycle. Then, as illustrated in FIG. 14(b), a BG2 instruction 1420 pops value V1 and value V2 off of stack 120 and performs the function of BG2 instruction 1420 during a second processing cycle. The results of LV instruction 1410 and BG2 instruction 1420 are illustrated in FIG. 14(c) with value V3 on top of stack 120. FIG. 14(d) illustrates how a stack based computing system using the principles of the present invention can perform LV instruction 1410 and BG2 instruction 1420 as a single instruction group during a single processing cycle. Specifically, LV-BG2 group 1480 retrieves value V1 directly from memory location A1 (i.e. without pushing value V1 onto stack 120), pops value V2 off of stack 120, and performs the function of the BG2 instruction during a single processing cycle. After LV-BG2 group 1480 is executed, value V3 is at the top of stack 120, as illustrated in FIG. 14(c). Thus, a LV instruction and a BG2 instruction are performed as a single instruction group instead of sequentially.

Figure 15B:
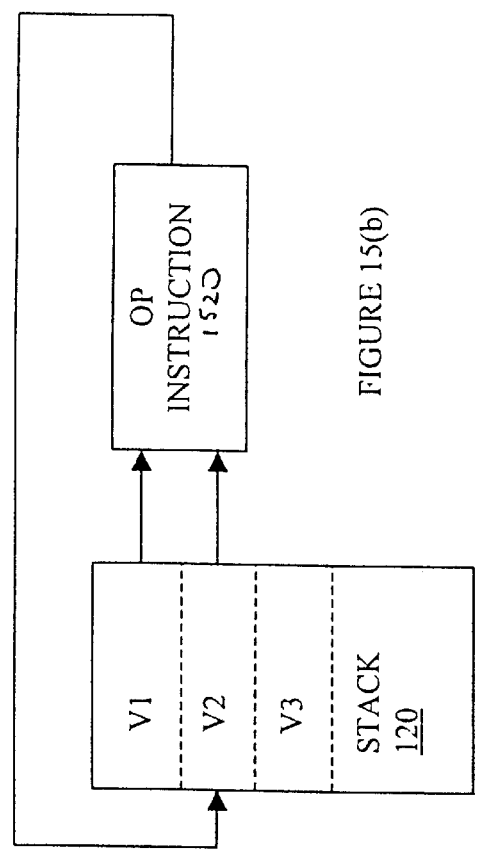
FIGS. 15(a)–15(e) illustrate the LV-OP-SV group of instructions in accordance with one embodiment of the present invention.
Figure 15D:
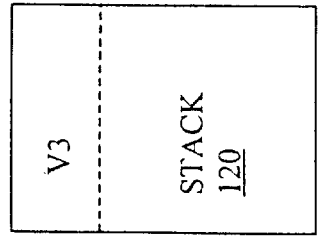
Figure 15A:
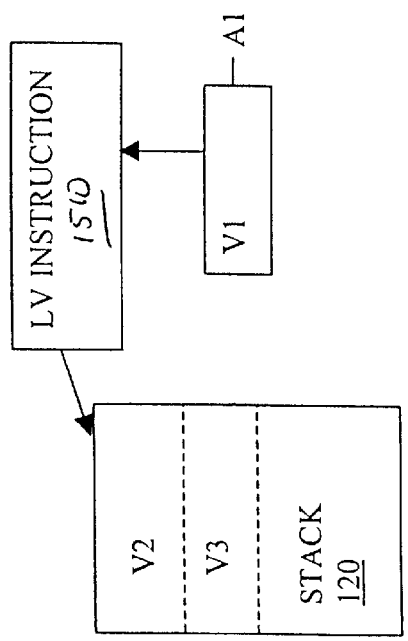
Figure 15C:
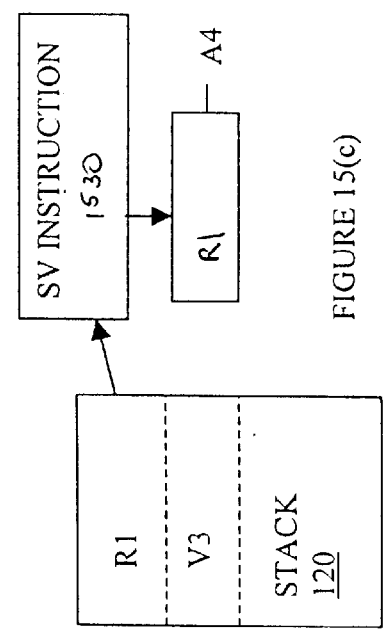
Figure 15E:
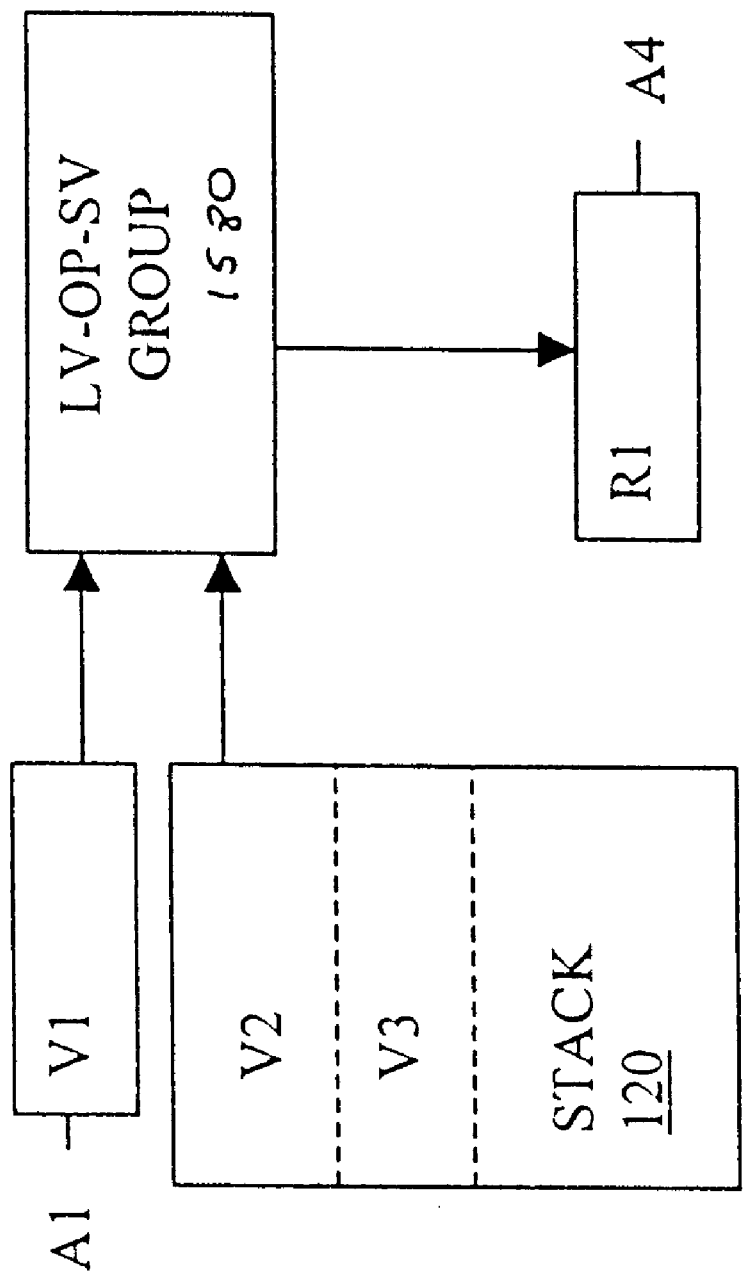

A LV instruction can be combined with an OP instruction and a SV instruction to form a LV-OP-SV group. FIGS. 15(a), 15(b), 15(c) and 15(d) illustrate how a conventional stack based computing system executes an LV instruction followed by an OP instruction followed by a SV instruction. In FIG. 15(a), a LV instruction 1510 pushes a value V1 from memory location A1 onto stack 120 during a first processing cycle. Then, as illustrated in FIG. 15(b), an OP instruction 1520 pops value V1 and value V2 off of stack 120, performs the function of OP instruction 1520, and pushes a result R1 (FIG. 15(c)) back on stack 120 during a second processing cycle. Then, as illustrated in FIG. 15(c), an SV instruction 1530 pops result R1 off of stack 120 and stores results R1 in a memory location A4 during a third processing cycle. The three operations leave value V3 on top of stack 120 and result R1 in memory location A4, as illustrated in FIG. 15(d). FIG. 15(e) illustrates how a stack based computing system using the principles of the present invention can perform LV instruction 1510, OP instruction 1520, and SV instruction 1530 as a single instruction group during a single processing cycle. Specifically, LV-OP-SV group 1580 retrieves value V1 directly from memory location A1 (i.e., without pushing value V1 onto stack 120) and pops value V2 off of stack 120. LV-OP-SV group 1580 also performs the function of OP instruction 1520 and stores results R1 directly into memory location A4 (i.e., without pushing results R1 onto stack 120). After LV-OP-SV group 1580 is executed, result R1 is stored in memory location A4 and value V3 is at the top of stack 120, as illustrated in FIG. 15(d). Thus, a LV instruction, an OP instruction, and a SV instruction are performed as a single instruction group instead of sequentially.

Figure 16B:
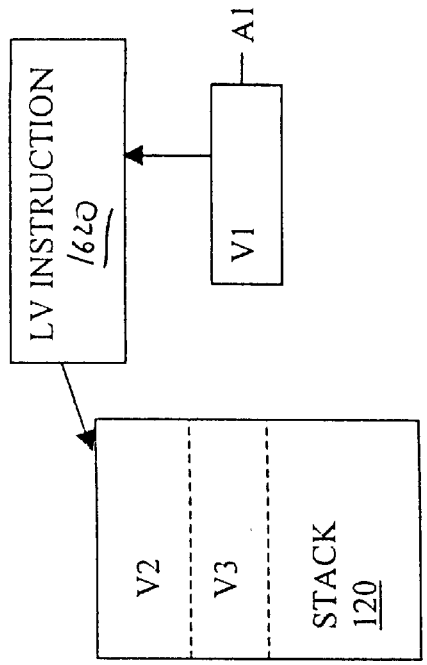
FIGS. 16(a)–16(e) illustrate the LV-LV-BG2 group of instructions in accordance with one embodiment of the present invention.
Figure 16D:
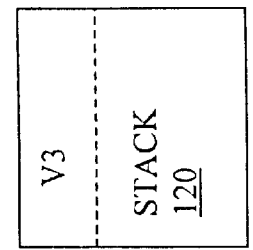
Figure 16A:
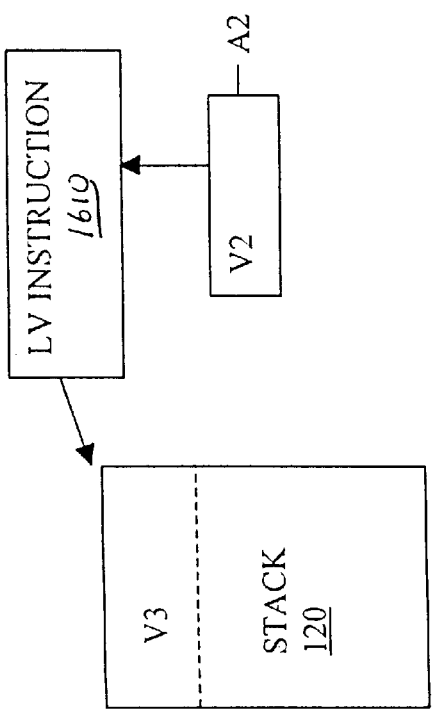
Figure 16C:
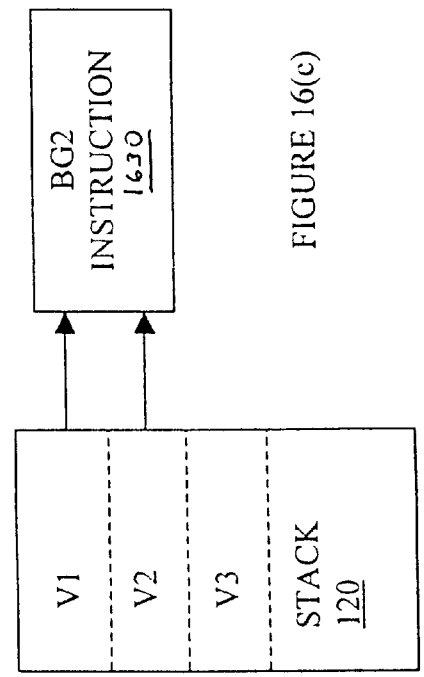
Figure 16E:
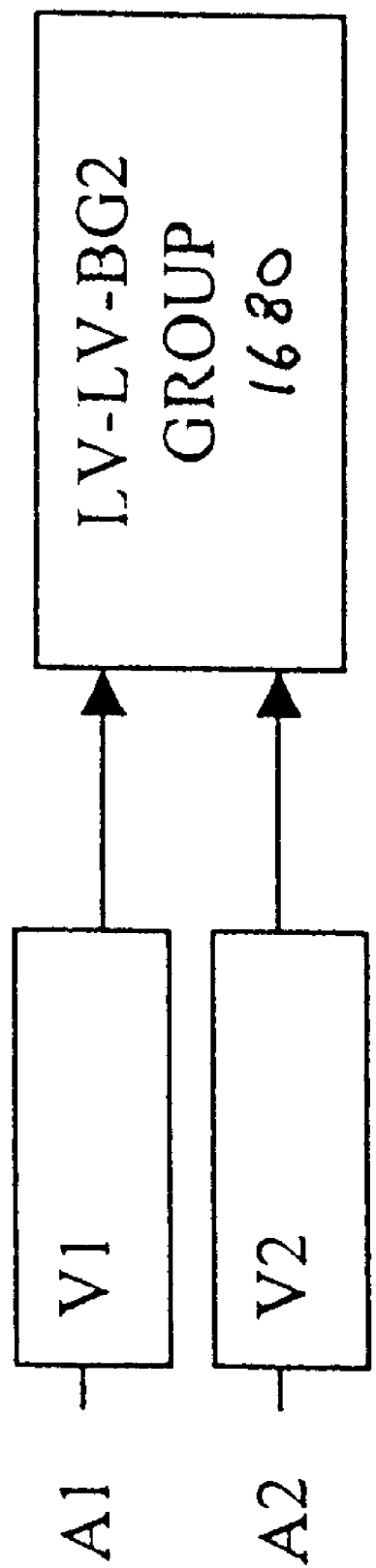

Another three-instruction group is the LV-LV-BG2 group, which combines two LV instructions with a BG2 instruction. FIGS. 16(a), 16(b), 16(c) and 16(d) illustrate how a conventional stack based computing system would handle a first LV instruction followed by a second LV instruction, followed by an BG2 instruction. As illustrated in FIG. 16(a), a LV instruction 1610 pushes value V2 from memory location A2 onto stack 120 during a first processing cycle. Then, as illustrated in FIG. 16(b), a second LV instruction 1620 pushes value V1 from memory location A1 onto stack 120 during a second processing cycle. Then, as illustrated in FIG. 16(c), a BG2 instruction 1630 pops value V1 and value V2 off of stack 120 and performs the function of the BG2 instruction during a third processing cycle. The results of LV instructions 1610, LV instruction 1620, and BG2 instruction 1630 are illustrated in FIG. 16(d) with value V3 on top of stack 120. FIG. 16(e) illustrates how a stack based computing system using the principles of the present invention can perform LV instruction 1610, LV instruction 1620, and BG2 instruction 1630 as a single instruction group in a single processing cycle. Specifically, LV-LV-BG2 group 1680 retrieves value V1 directly from memory location A1 (i.e. without pushing value V1 onto stack 120) and value V2 directly from memory location A2. LV-LV-BG2 group 1680 also performs the function of BG2 instruction 1630. After LV-LV-BG2 group 1680 is executed, value V3 is at the top of stack 120, as illustrated in FIG. 16(d). Thus, two LV instructions and a BG2 instruction are performed as a single instruction group instead of sequentially.

Figure 17B:
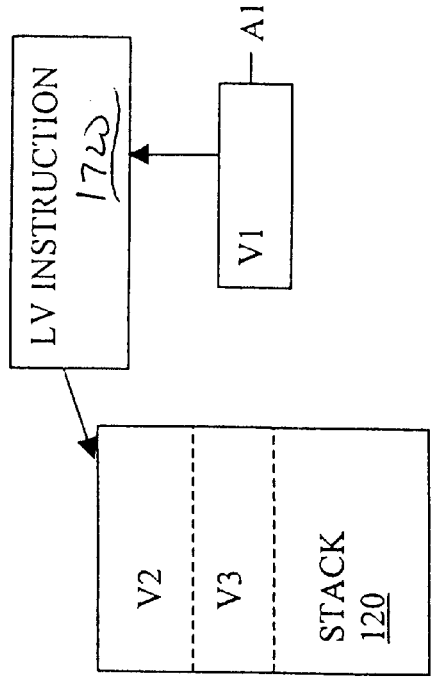
FIGS. 17(a)–17(e) illustrate the LV-LV-OP group of instructions in accordance with one embodiment of the present invention.
Figure 17D:
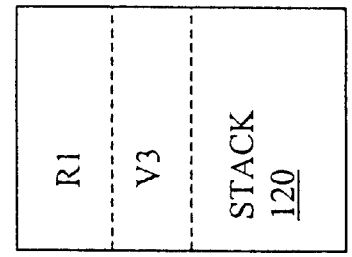
Figure 17A:
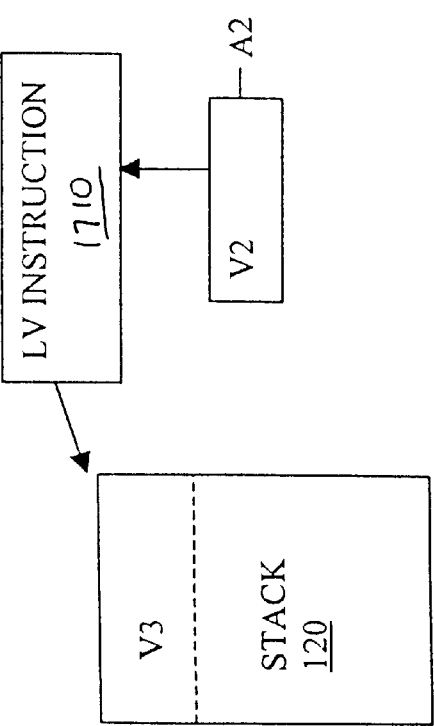
Figure 17C:
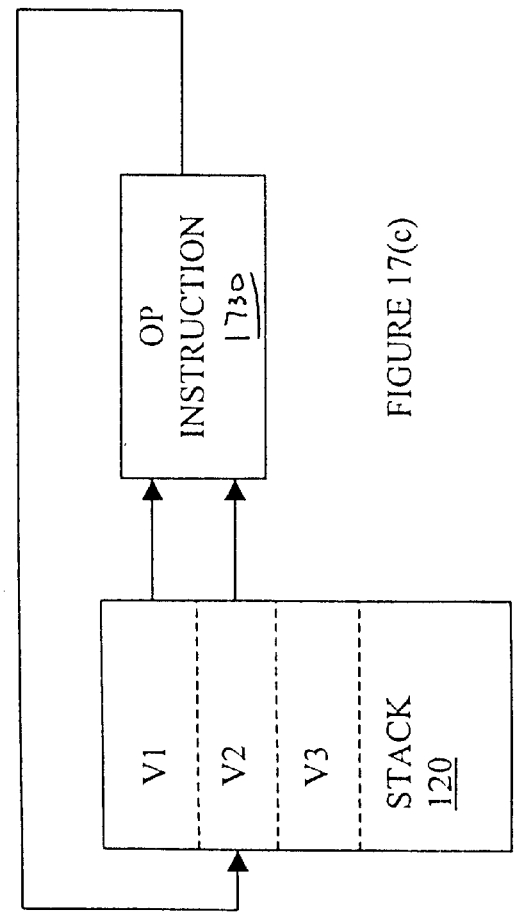
Figure 17E:
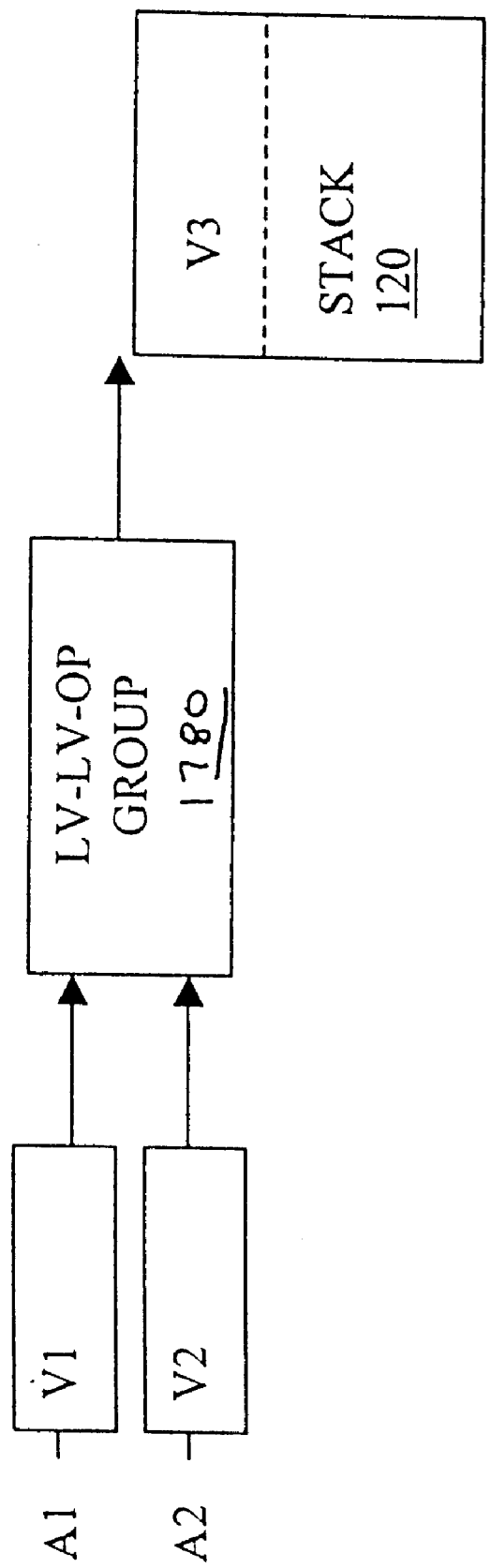

Another three-instruction group is the LV-LV-OP group, which combines two LV instructions with an OP instruction. FIGS. 17(a), 17(b), 17(c) and 17(d) illustrate how a conventional stack based computing system would handle a first LV instruction followed by a second LV instruction, followed by an OP instruction. As illustrated in FIG. 17(a), a LV instruction 1710 pushes a value V2 from memory location A2 onto stack 120 during a first processing cycle. Then, as illustrated in FIG. 17(b), a second LV instruction 1720 pushes value V1 from memory location A1 onto stack 120 during a second processing cycle. Then, as illustrated in FIG. 17(c), an OP instruction 1730 pops value V1 and value V2 off of stack 120, performs the function of OP instruction 1730, and pushes result R1 onto stack 120 during a third processing cycle. The results of LV instruction 1710, LV instruction 1720, and OP instruction 1730 are illustrated in FIG. 17(d) with result R1 on top of stack 120. FIG. 17(e) illustrates how a stack based computing system using the principles of the present invention can perform LV instruction 1710, LV instruction 1720, and the OP instruction 1730 as a single instruction group during a single processing cycle. Specifically, LV-LV-OP group 1780 retrieves value V1 directly from memory location A1 and value V2 directly from memory location A2. LV-LV-OP group 1780 also performs the function of OP instruction 1730 and pushes result R1 onto stack 120. After the LV-LV-OP group is executed, result R1 is at the top of stack 120, as illustrated in FIG. 17(e). Thus, two LV instructions and an OP instruction are performed as a single instruction group instead of sequentially.

Figure 18B:
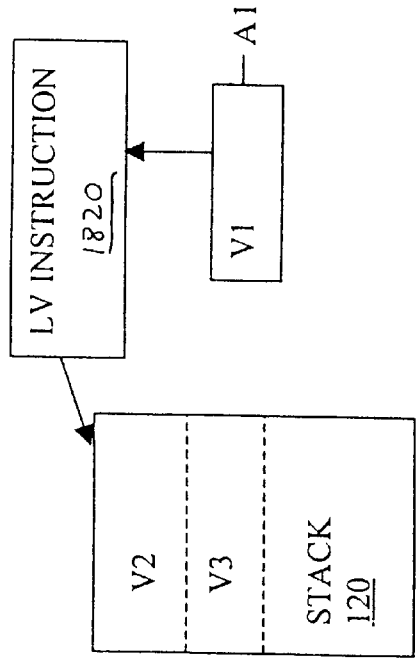
FIGS. 18(a)–18(f) illustrate the LV-LV-OP-SV group of instructions in accordance with one embodiment of the present invention.
Figure 18A:
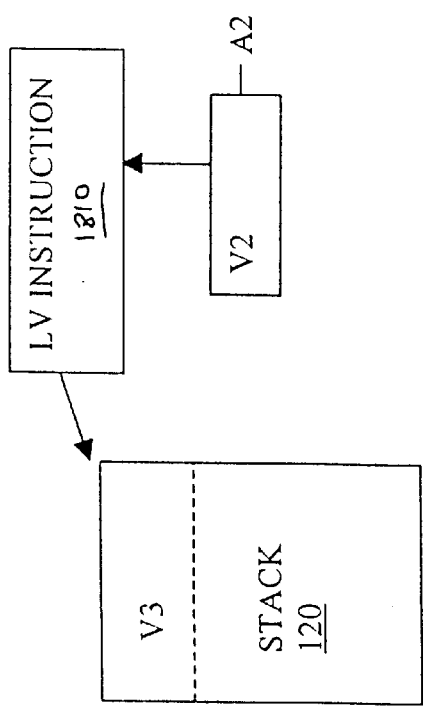
Figure 18D:
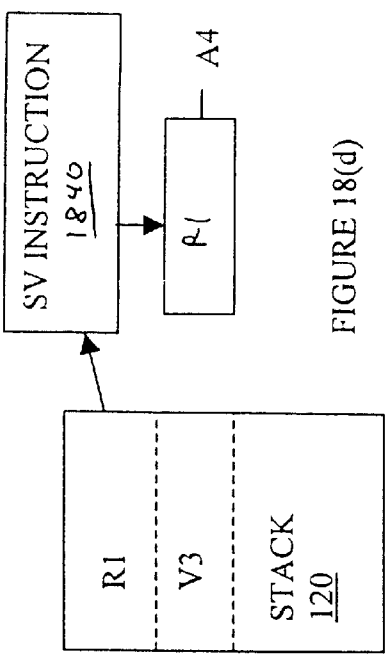
Figure 18C:
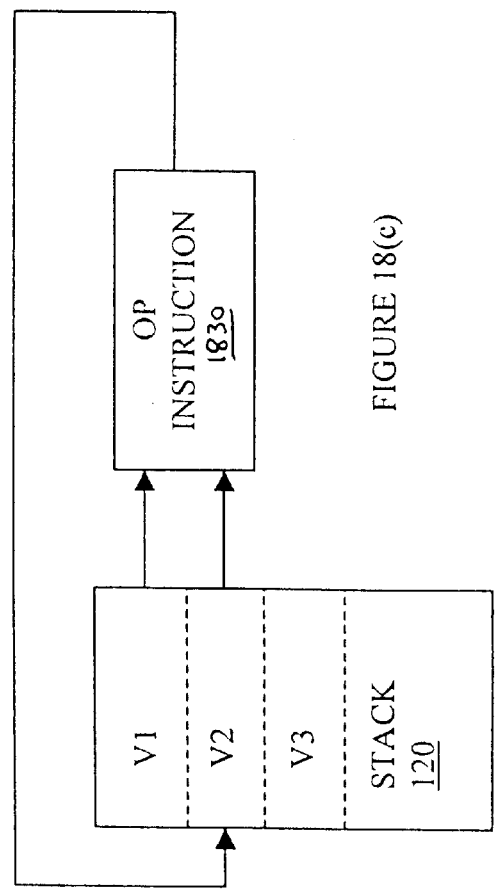
Figure 18F:
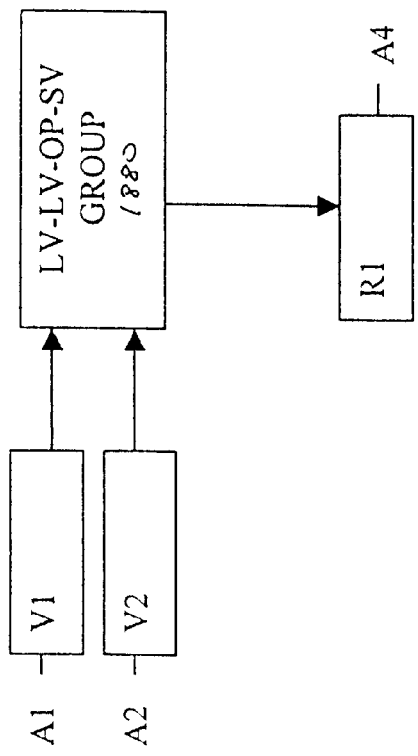
Figure 18E:
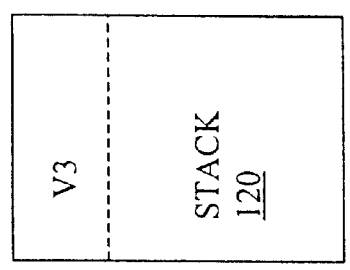
Figure 18E:
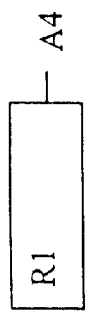

A four-instruction group is the LV-LV-OP-SV group, which combines two LV instructions, an OP instruction, and a SV instruction. FIGS. 18(a), 18(b), 18(c), 18(d) and 18(e) illustrate the behavior of a conventional stack based computing system. Specifically, as illustrated in FIG. 18(a), a first LV instruction 1810 pushes value V2 from memory location A2 onto stack 120 during a first processing cycle. Then, as illustrated in FIG. 18(b), a second LV instruction 1820 pushes value V1 from memory location A1 onto stack 120 during a second processing cycle. Then, as illustrated in FIG. 18(c), an OP instruction 1830 pops value V1 and value V2 off of stack 120, performs the function of OP instruction 1830, and pushes a result R1 onto stack 120 during a third processing cycle. Finally, as illustrated in FIG. 18(d), a SV instruction 1840 pops result R1 off of stack 120 and stores result R1 into memory location A4 during a fourth processing cycle. The results of LV instruction 1810, LV instruction 1820, OP instruction 1830, and SV instruction 1840 are illustrated in FIG. 18(e) with result R1 stored in memory location A4 and value V3 at the top of stack 120. FIG. 18(f) illustrates how a stack based computing system using the principles of the present invention can execute LV instruction 1810, LV instruction 1820, OP instruction 1830, and SV instruction 1840 as a single instruction group during a single processing cycle. Specifically, a LV-LV-OP-SV group 1880 retrieves value V1 directly from memory location A1 and value V2 directly from memory location A2. LV-LV-OP-SV group 1880 then performs the function of OP instruction 1830 and stores result R1 directly into memory location A4. After LV-LV-OP-SV group 1880 is executed, result R1 is in memory location A4 and value V3 is in the top of stack 120, as illustrated in FIG. 18(e). Thus, two LV instructions, an OP instruction, and a SV instruction are performed as a single instruction group instead of sequentially.

Execution Unit

Figure 19:
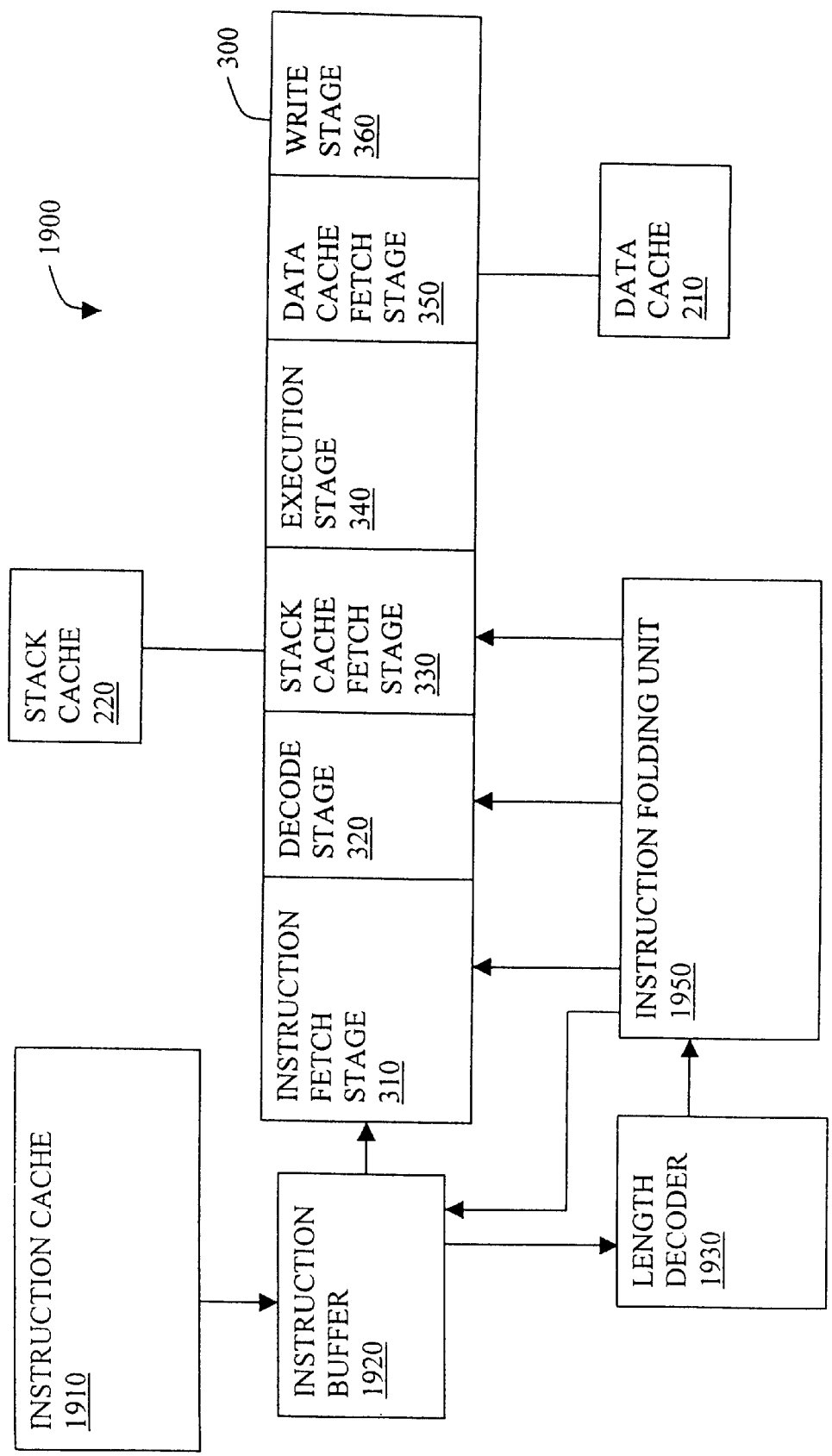
FIG. 19 is a block diagram of an execution unit in accordance with one embodiment of the present invention.

FIG. 19, illustrates an execution unit for a stack based computing system in accordance with one embodiment of the present invention.

As explained above, the instructions and groups illustrated above are executed in an execution unit. FIG. 19 shows an execution unit 1900 in accordance with one embodiment of the present invention. Execution unit 1900 includes an instruction cache 1910, an instruction buffer 1920, an optional length decoder 1930, instruction pipeline 300, and an instruction-folding unit 1950.

Instruction cache 1910 can be a conventional instruction cache comprising fast memory circuits. Frequently used instructions are stored in instruction cache 1910 to minimize memory latencies. Instruction buffer 1920 retrieves instructions that are to be executed from instruction cache 1910. Since instructions are typically executed in a sequential order, instruction buffer 1920 is often implemented as a FIFO (First-In First-Out memory). For example, in one embodiment of execution unit 1900, instruction buffer 1920 is a 16 byte pre-fetch FIFO, which retrieves instructions which will be executed in instruction pipeline 300. Instruction pipeline 300 is also coupled to stack cache 220 and data cache 210 for retrieving operands for the instructions.

In some embodiments of stack based computing systems, instructions are of differing lengths. For these embodiments, length decoder 1930 computes the length of the instructions in instruction buffer 1920 for instruction-folding unit 1950. Instruction-folding unit 1950 determines if the instructions in instruction buffer 1920 form an instruction group. Instruction pipeline 300 executes the instructions or instruction group as described above with respect to FIGS. 3 and 4. In some embodiments of execution unit 1900, length decoder 1930 and instruction-folding unit 1950 are incorporated within instruction pipeline 300. For example, one specific embodiment of execution unit 1900 includes length decoder 1930 in instruction fetch stage 310 of instruction pipeline 300, and instruction-folding unit 1950 in decode stage 320 of instruction pipeline 300.

Figure 20:
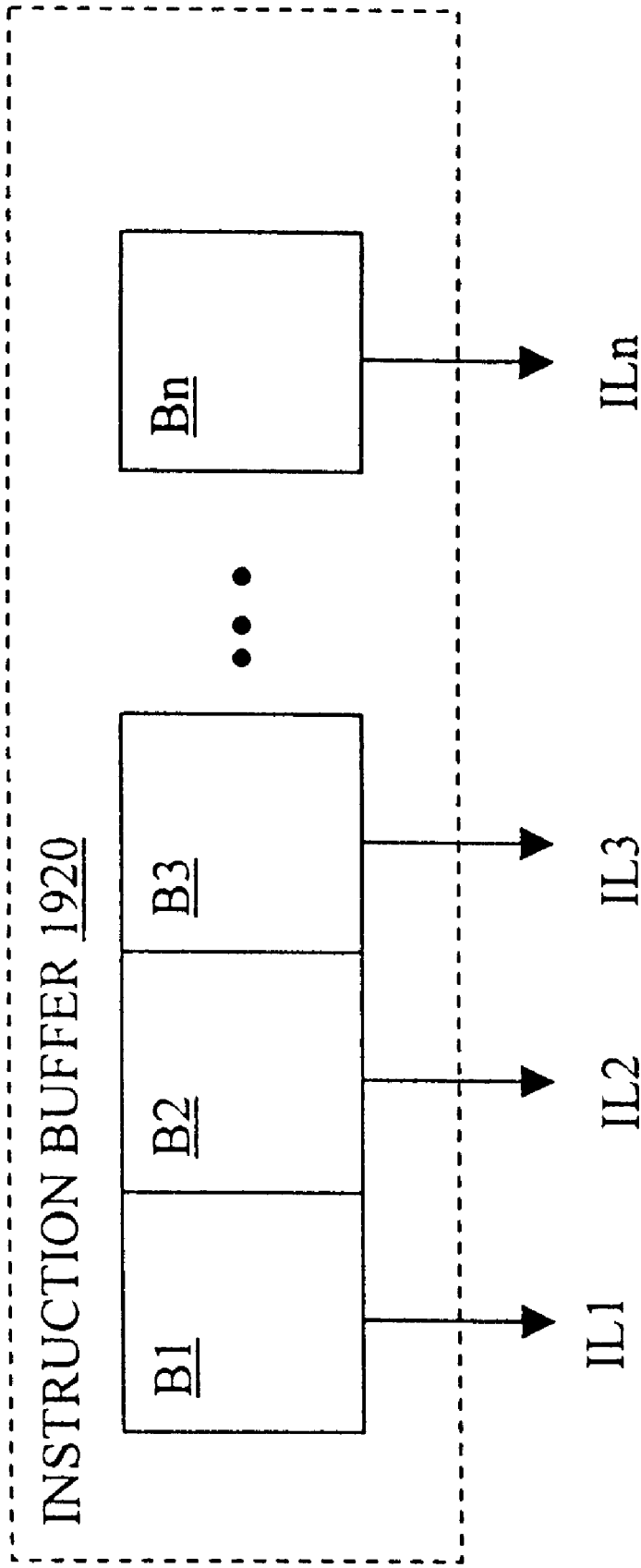
FIG. 20 is a block diagram of an instruction buffer in accordance with one embodiment of the present invention.

FIG. 20 shows a specific embodiment of instruction buffer 1920 comprising n bytes labeled B1, B2 ... Bn. Each byte of instruction buffer 1920 outputs an instruction length signal IL. The instruction length signal indicates the length of the instruction stored in the byte. To avoid confusion, signals and the values of the signals are given the same reference numeral. Thus, instruction length ILx is provided on instruction length signal ILx, which can comprise of a plurality of bits. The actual length of an instruction is stored in the first byte of the instruction. However, each byte of instruction buffer 1920 outputs an instruction length signal IL. Thus, the instruction length signal is only meaningful for bytes that contain the starting byte of an instruction. The instruction length signal of a byte Bx is labeled ILx. In some embodiments, the length of instruction buffer 1920 is greater than the length of the longest instruction group. Many of these embodiments do not provide the instruction length of the bytes beyond the length of the largest instruction group. As used herein, byte B1 is the starting location in instruction buffer 1920 of the next instruction to be executed by execution unit 1900. In many embodiments of instruction buffer 1920, byte B1 is not always the same physical memory structure. For example, a common way to implement a FIFO is to use a read pointer to indicate where in the memory structure of the FIFO the oldest data word is stored and a write pointer to indicate where the next incoming data word should be stored. The read pointer and write pointer traverse different memory locations as words are written into or read out of the FIFO.

Figure 21:
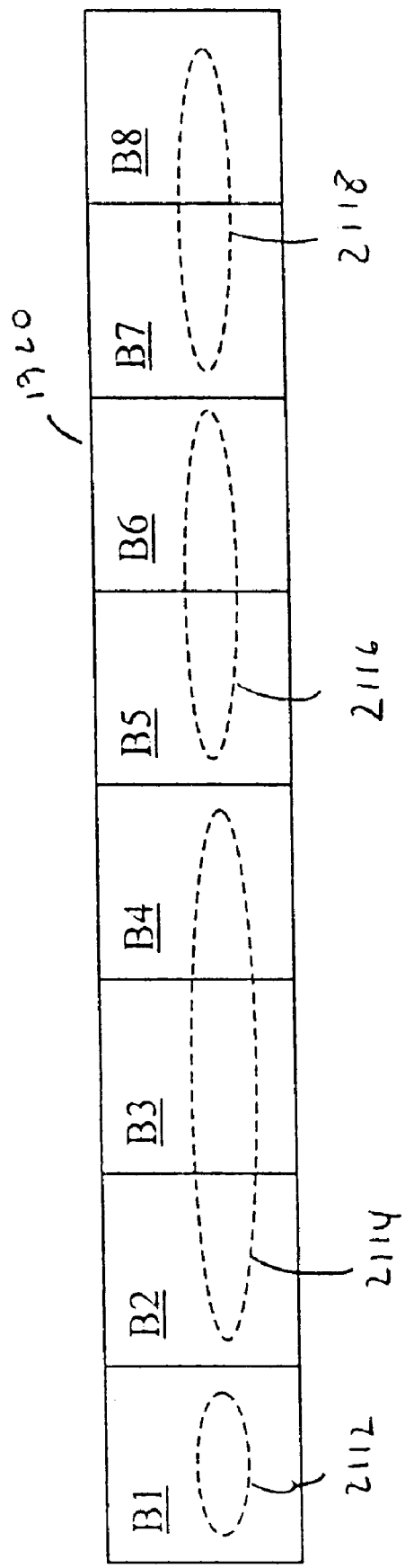
FIG. 21 is block diagram of an instruction buffer containing instructions in accordance with one embodiment of the present invention.

Instructions are typically of variable length; therefore, an instruction can reside in multiple bytes of instruction buffer 1920. FIG. 21 illustrates how four instructions may be stored in instruction buffer 1920. In FIG. 21, instruction pipeline 1920 contains an one-byte instruction 2112 in byte B1, a three-byte instruction 2114 in bytes B2, B3 and B4, a two-byte instruction 2116 in bytes B5 and B6, and a two-byte instruction 2118 in bytes B7 and B8. If instruction buffer 1920 is larger than eight bytes, additional instructions may be stored in instruction buffer 1920. Instruction length IL1 equals one, instruction length IL2 equals three, instruction length signal IL5 equals two, and instruction length IL7 is equal to two. Instruction lengths IL3, IL4, IL6, and IL8 are not meaningful because bytes B3, B4, B6, and B8 do not contain the first byte of an instruction.

The instruction length signals are coupled to length decoder 1930. Length decoder 1930 decodes the instruction length signals to determine the length of possible instruction groups in instruction buffer 1920. Typically, length decoder 1930 only decodes the bytes that might be included into an instruction group. Thus, for example, if the longest instruction group is only seven bytes long, most implementations of execution unit 1900 includes a length decoder that only examines the first seven bytes of instruction buffer 1920. Even if no instruction group is formed, length decoder 1930 calculates the group length as if the first instruction, which is not being folded, is an instruction group containing only one instruction. The group length of one-instruction instruction groups is referred to as group length GL1.

Since byte B1 contains the beginning of the first instruction in instruction buffer 1920, instruction length IL1 equals the length of the first instruction. Group length GL1 would equal IL1 since the group length of a one-instruction instruction group would equal the length of the only instruction in the group. If a two-instruction instruction group is formed, the group length GL2 of the two-instruction instruction group would be the sum of the lengths of the two instructions. For the instructions illustrated in FIG. 21, group length GL2 would equal the length of instruction 2112 plus the length of instruction 2114. As explained above, the length of instruction 2112 is provided as instruction length IL1 and the length of instruction 2114 is provided as instruction length IL2. Thus, group length GL2 is equal to instruction length IL1 plus instruction length IL2.

Similarly, if instruction 2112, instruction 2114, and instruction 2116 formed a three-instruction instruction group, the group length GL3 of the three-instruction instruction group would equal instruction length IL1 plus instruction length IL2 plus instruction length IL5. For a four-instruction instruction group, the group length GL4 would equal instruction length IL1 plus instruction length IL2 plus instruction length IL5 plus instruction length IL7.

Thus, the group lengths can be calculated by sequentially adding the appropriate instruction lengths. However, calculation of group length by sequentially adding instruction lengths is likely to lower the performance of execution unit 1900 if execution unit 1900 is operating at a high clock frequency. Therefore, high clock frequency execution units may require a rapid length decoder.

Figure 22:
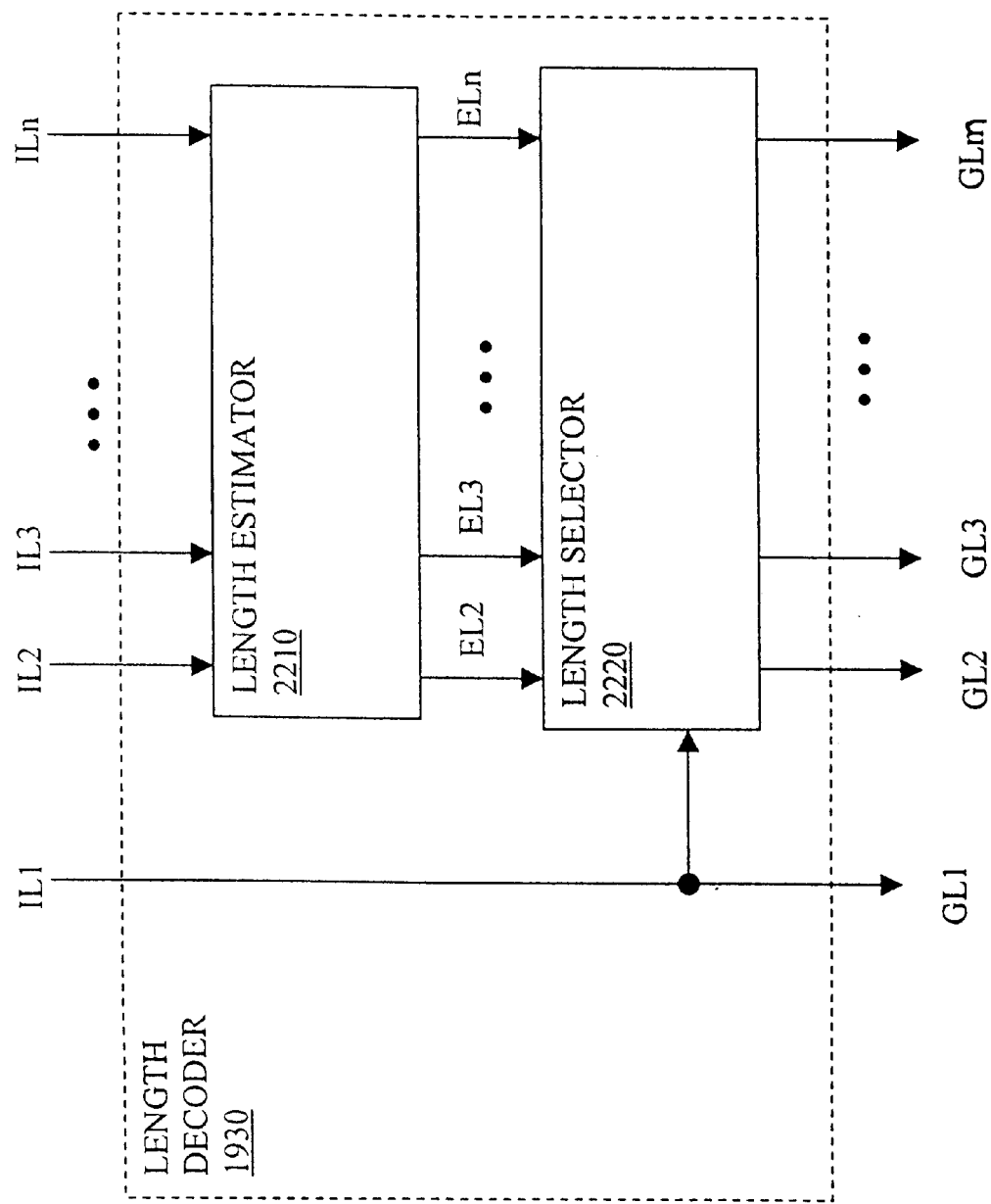
FIG. 22 is a block diagram of a length decoder in accordance with one embodiment of the present invention.

FIG. 22 shows an embodiment of length decoder 1930, which determines group length very rapidly. As explained above, length decoder 1930 receives instruction length signals and generates group length signals. In the embodiment of FIG. 22, length decoder 1930 includes a group length estimator 2210 and a group length selector 2220. Since instruction length IL1 is equal to group length GL1, length decoder 1930 can couple instruction length signal IL1 to be outputted as group length signal GL1. Instruction lengths signal IL2 through instruction length signal ILn are coupled to length estimator 2210. Length estimator 2210 calculates estimate lengths EL1 to EL(n-1). Estimate lengths EL1 to EL(n-1) represents all possible group lengths based on the instruction length signals. Length selector 2220 determines which of the estimated lengths are accurate and provide group length signals GL2 to GLm. Where m is the size of the largest possible group.

Figure 23:
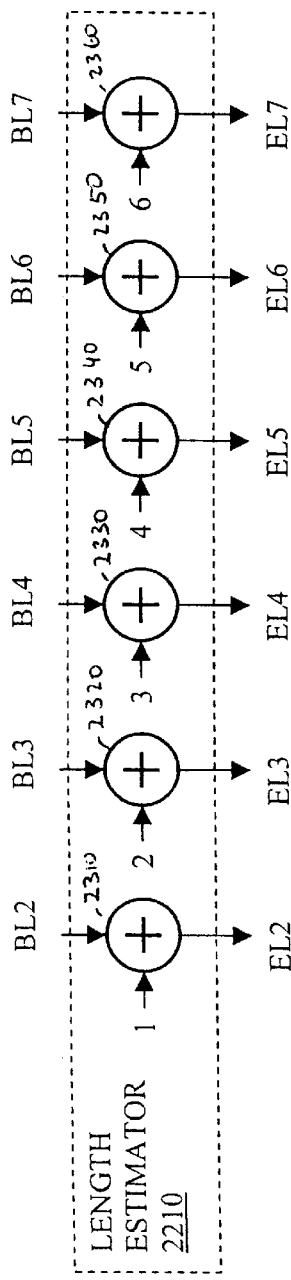
FIG. 23 is a block diagram of a length estimator in accordance with one embodiment of the present invention.

FIG. 23 shows one embodiment of length estimator 2210. In the embodiment of FIG. 23, length estimator 2210 is designed to use up to seven bytes of instruction buffer 1920. Other embodiments may differ. In FIG. 23, length estimator 2210 contains adders 2310, 2320, 2330, 2340, 2350, and 2360. Adder 2310 generates estimated length EL2 by adding one (a fixed value) to instruction length IL2. Adder 2320 calculates EL3 by adding two to instruction length IL3. Adder 2330 calculates EL4 by adding three to instruction length IL4. Adder 2340 calculates EL5 by adding four to instruction length IL5. Adder 2350 calculates EL6 by adding five to instruction length IL6. Adder 2360 calculates EL7 by adding six to instruction length IL7. In general, for an embodiment with n instruction length inputs, length estimator 2210 contains n-1 adders and calculates n estimated length. The estimated length ELx is equal to instruction length ILx plus (x-1).

Intuitively, in the embodiment of FIG. 23, each estimated length is calculated with the assumption that the corresponding byte in instruction buffer 1920 contains the first byte of an instruction. Furthermore, if an instruction is included in a group, all the bytes preceding the instruction are also included in the group. For example, referring again to FIG. 21, if instruction 2116 is included in an instruction group, bytes B1, B2, B3, and B4 must also be included in the instruction group. Therefore, the group length of a group containing instruction 2116 is equal to the length of instruction 2116, which is provided as instruction length IL5, plus the number of bytes in instruction buffer 1920 preceding instruction 2116, which in this case is four. Similarly, if instruction 2118 is included in a group, the group length would equal the number of bytes preceding instruction 2118, i.e. six, plus the length of instruction 2118, i.e. instruction length IL7. Thus, in general, each estimated length ELx is equal to instruction length ILx plus (x-1).

Figure 24:
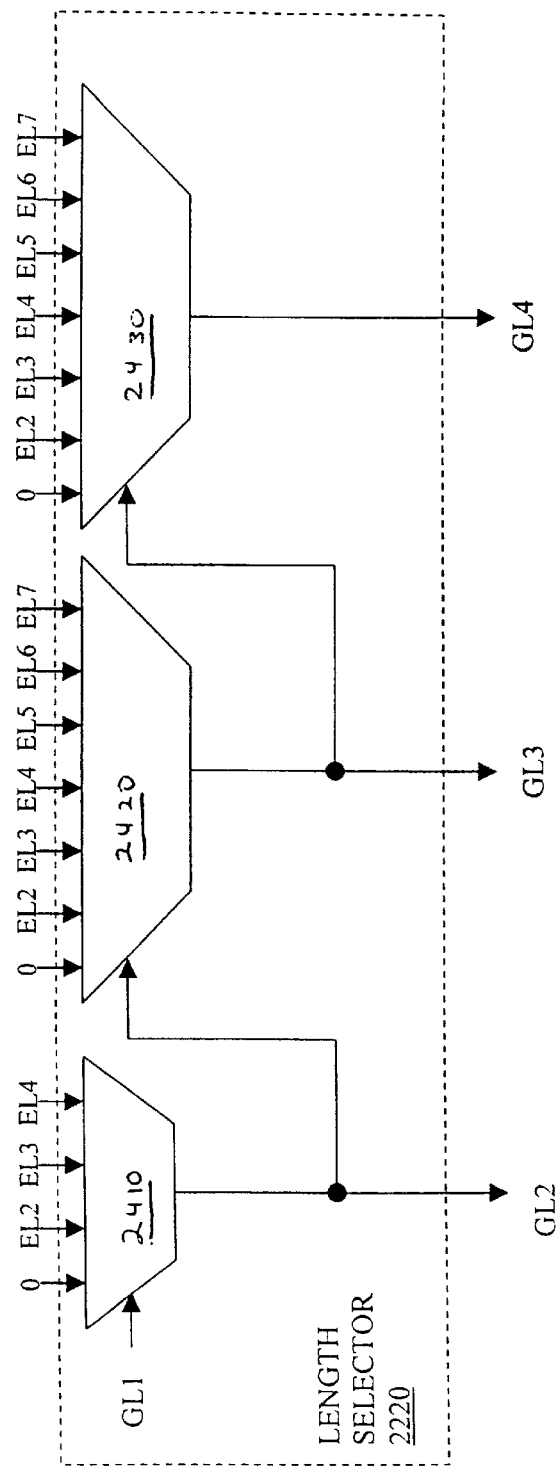
FIG. 24 is a block diagram of a length selector in accordance with one embodiment of the present invention.

FIG. 24 shows an embodiment of length selector 2220. The embodiment of FIG. 24 is designed to determine group lengths for groups containing up to four instructions. In addition, the embodiment of FIG. 24 is designed for grouping up to seven bytes in an instruction group. Length selector 2220 includes a multiplexer 2410, a multiplexer 2420, and a multiplexer 2430. As explained above, group length GL1, the length for instruction groups containing only one instruction is equal to instruction length IL1. Therefore, length selector 2220 need only select the appropriate estimated lengths for group length GL2, group length GL3, and group length GL4.

Multiplexer 2410 generates group length GL2. Multiplexer 2410 is coupled to receive a value of zero, estimated length EL2, estimated length EL3, and estimated length EL4. Group length GL1 is coupled to the selection terminals of multiplexer 2410. The inputs necessary for multiplexer 2410 is determined by the length of the longest foldable instruction. In general, if the length of the longest foldable instruction is equal to x, multiplexer 2410 would need estimated lengths EL1, EL2, . . . ELx. For example, if the longest foldable instruction is only two bytes long, multiplexer 2410 would require estimated length EL1 and estimated length EL2 as inputs. Similarly, if the longest foldable instruction is four bytes long, multiplexer 2310 would need estimated lengths EL1, EL2, EL3, and EL4 as inputs. For the embodiment of FIG. 24, the length of the largest foldable instruction is three.

As explained above, each estimated length is calculated with the assumption that the corresponding byte in instruction buffer 1920 is the start of an instruction. Group length GL1 is the length of the first instruction in instruction buffer 1920. Therefore, the second instruction in instruction buffer 1920 begins after GL1 bytes. Consequently, if the second instruction is to be folded, then estimated length ELt, where t equals group GL1 plus one, should be selected as group length GL2.

Multiplexer 2420 generates group length GL3. Multiplexer 2420 is coupled to receive a value of zero, estimated length EL2, estimated length EL3, estimated length EL4, estimated length EL5, and estimated length EL6. Group length GL2 is coupled to the selection terminals of multiplexer 2420. The inputs necessary for multiplexer 2420 is determined by the length of the longest foldable instruction. In general, if the length of the longest foldable instruction is equal to x, multiplexer 2420 would need estimated lengths EL1, EL2, ..., EL(2*x). For example, if the longest foldable instruction is only two bytes long, multiplexer 2420 would require estimated length EL1, EL2, EL3 and EL4 as inputs. However, the maximum length allowed in an instruction group can limit number of inputs needed by multiplexer 2420. For example, if the longest foldable instruction is four bytes long and the maximum length allowed in an instruction group is seven, multiplexer 2420 would not need an estimated length EL8.

In general, group length GL3 should equal the sum of the lengths of the first three instructions in instruction buffer 1920. Group length GL2 is equal to the length of the first instruction in instruction buffer 1920 plus the second instruction in instruction buffer 1920. Therefore, the third instruction in instruction buffer 1920 begins after GL2 bytes. Consequently, if the third instruction is to be folded, then estimated length ELt, where t equals group length GL2 plus one, should be selected as group length GL3.

Multiplexer 2430 generates group length GL4. Multiplexer 2430 is coupled to receive a value of zero, estimated length EL2, estimated length EL3, estimated length EL4, estimated length EL5, and estimated length EL6. Group length GL3 is coupled to the selection terminals of multiplexer 2430. The inputs necessary for multiplexer 2430 is determined by the length of the longest foldable instruction. In general, if the length of the longest foldable instruction is equal to x, multiplexer 2430 would need estimated lengths ELi, EL2, ... EL(3*x). For example, if the longest foldable instruction is only two bytes long, multiplexer 2420 would require estimated lengths EL1, EL2, EL3, EL4, EL5, and EL6 as inputs. However, the maximum length allowed in an instruction group can limit number of inputs needed by multiplexer 2430. Thus, in the embodiment of FIG. 24, even though, the longest foldable instruction is three bytes long, the maximum length of an instruction group, seven, eliminates the need for estimated lengths EL8 and EL9 for multiplexer 2340.

In general, group length GL4 should equal the sum of the lengths of the first four instructions in instruction buffer 1920. Group length GL3 is equal to the sum of the lengths of the first three instructions in instruction buffer 1920. Therefore, the fourth instruction in instruction buffer 1920 begins after GL3 bytes. Consequently, if the fourth instruction is to be folded, then estimated length ELt, where t equals group length GL3 plus one should be selected as group length GL4.

As compared to a conventional length decoder, which decodes the group lengths by performing m additions sequentially for a m-instruction instruction group, a length decoder in accordance with the present invention decodes the group lengths after only one addition step and m-1 multiplexer propagation delays. Since multiplexer propagation delays are significantly less than the time required to perform an addition, length decoders in accordance with the present invention can decode group lengths more rapidly than conventional length decoders. Therefore, length decoders in accordance with the present invention are well suited for high clock frequency execution units. Table 1 provides an example using the embodiments of FIG. 23 and 24 using the instructions shown in FIG. 21. In Table 1, NM means not meaningful.

TABLE 1

| n | ILn | Eln | Gn |
|---|---|---|---|
| 1 | 1 | 1 | 1 |
| 2 | 3 | 4 | 4 |
| 3 | NM | NM | 6 |
| 4 | NM | NM | 8 |
| 5 | 2 | 6 | |
| 6 | NM | NM | |
| 7 | 2 | 8 | |

Figure 25:
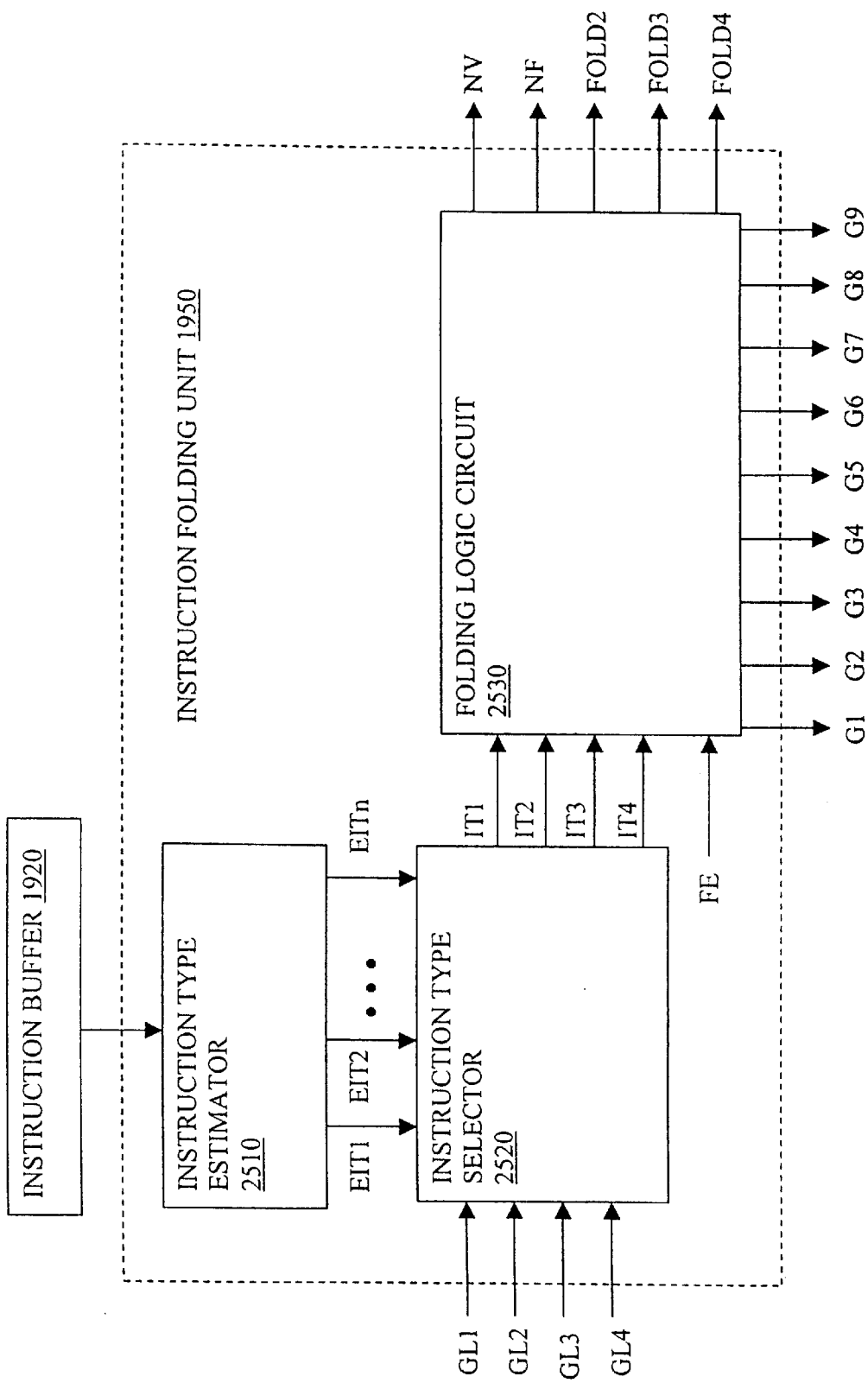
FIG. 25 is a block diagram of an instruction-folding unit in accordance with one embodiment of the present invention.

FIG. 25 shows one embodiment of instruction-folding unit 1950 coupled to instruction buffer 1920. The embodiment of FIG. 25 includes an instruction type estimator 2510, an instruction type selector 2520, and a folding logic circuit 2530. Instruction type estimator 2510 estimates the instruction type for the relevant bytes of instruction pipeline 1920 assuming each byte is the beginning of an instruction, which contains the opcode of the instruction. Instruction type estimator 2510 generates an estimated instruction type signal EITx for each byte Bx. Instruction selector 2520 selects the correct instruction type from the estimated instruction type signals using the principles discussed above with respect to length selector 2220. Instruction type selector 2520 generates instruction type signals IT1, IT2, IT3, and IT4 for the first four instructions in instruction buffer 1920. However, under certain conditions, such as due to long instructions occupying instruction buffer 1920, some of the instruction type signals might not be generated. Thus instruction type estimator 2510 and instruction type selector 2520 determines the instruction type for a first subset of instructions that can be combined into instruction groups.

Folding logic circuit 2530 uses the instruction type signals to determine whether the leading instructions in instruction buffer 1920 form an instruction group. In the embodiment of FIG. 25, folding logic circuit 2530 generates a separate signal for each group type to indicate whether a particular group type is found. Folding logic circuit 2530 can also generate signals to indicate how many instructions were folded, i.e. combined into a group. Thus, signal FOLD2 indicates a two-instruction instruction group, signal FOLD3 indicates a three-instruction instruction group, and signal FOLD4 indicates a four-instruction instruction group. Thus, folding logic circuit 2530 combines a second subset of instructions into the instruction group. The second subset may be equal to the first subset of instructions decoded by instruction type estimator 2510 and instruction type selector 2520. In addition, most embodiments of folding logic circuit 2530 also includes a fold enable control signal FE. Fold enable control signal FE can be used to force folding logic circuit 2530 to indicate no folding of instructions is possible.

Figures 26, 27:
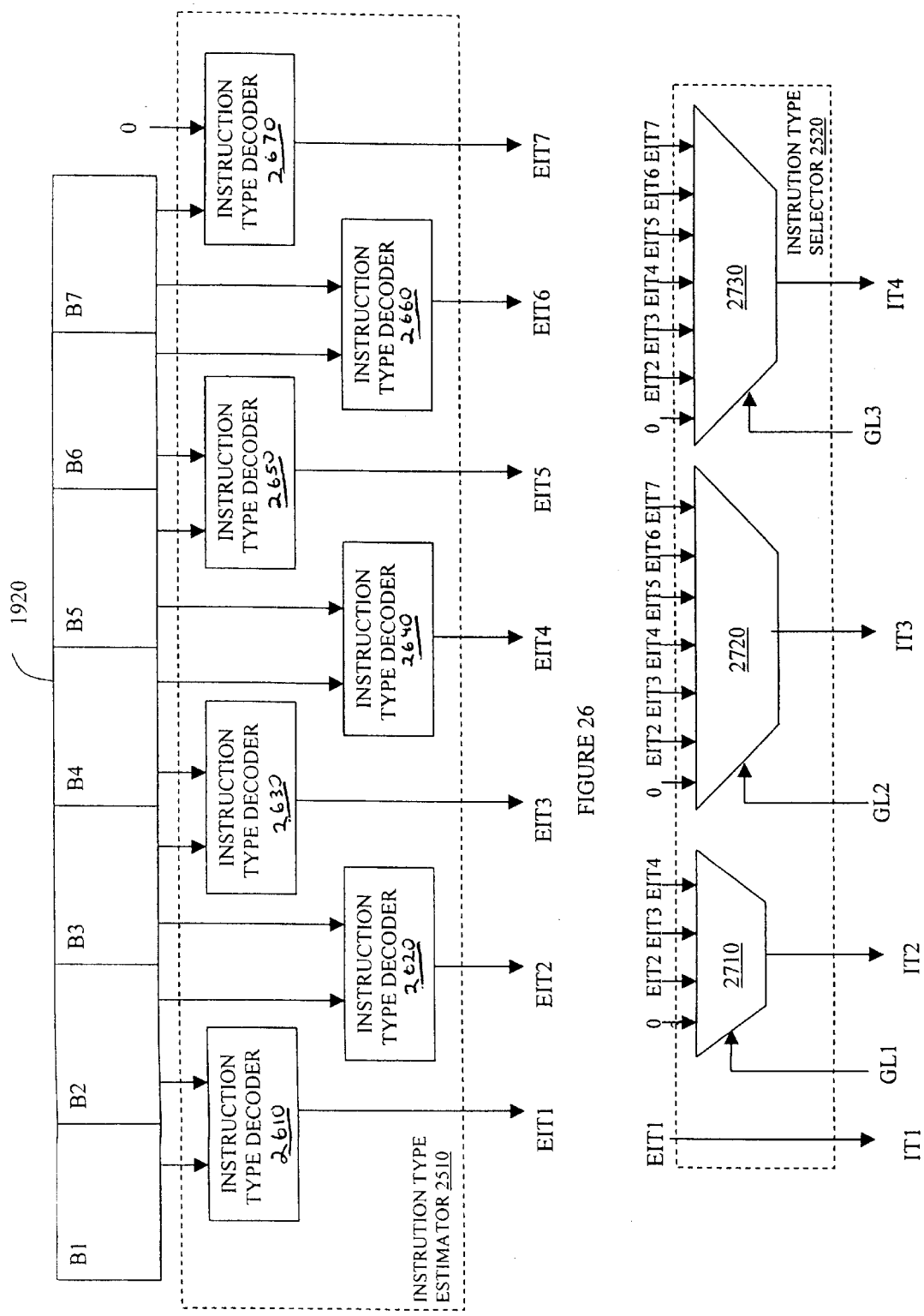
FIG. 26 is a block diagram of an instruction type estimator in accordance with one embodiment of the present invention.
FIG. 27 is a block diagram of an instruction type selector in accordance with one embodiment of the present invention.

FIG. 26 shows one embodiment of instruction type estimator 2510. In the embodiment of FIG. 26, instruction type estimator 2510 is designed to use up to seven bytes of instruction buffer 1920. Other embodiments may differ. In FIG. 26, instruction type estimator 2510 contains instruction type decoders 2610, 620, 2630, 2640, 2650, 2660, and 2670. The instruction type decoders decodes a one byte opcode or a two byte extended opcode into an instruction type, e.g. OP, BG1, BG2, LV, SV, or NF. The instruction decoders can be implemented with well-known techniques such as a lookup table or combinatorial logic. Instruction type decoder 2610 generates estimated instruction type EIT1 by decoding byte B1 and byte B2. Instruction decoder 2620 generates estimated instruction type EIT2 by decoding byte B2 and byte B3. Instruction decoder 2630 generates estimated instruction type EIT3 by decoding byte B3 and byte B4. Instruction decoder 2640 generates estimated instruction type EIT4 by decoding byte B4 and byte B5. Instruction decoder 2650 generates estimated instruction type EIT5 by decoding byte B5 and byte B6. Instruction decoder 2660 generates estimated instruction type EIT6 by decoding byte B6 and byte B7. Only the estimated instruction types from bytes that are the beginning of an instruction are valid. Instruction type selector 2520 selects the appropriate estimated instruction type to generate the actual instruction type for each instruction.

FIG. 27 shows an embodiment of instruction type selector 2520. The embodiment of FIG. 27 includes a multiplexer 2710, a multiplexer 2720, and a multiplexer 2730. Because, the embodiment instruction type selector 2510 in FIG. 27 uses the same principles as the embodiment of length selector 2220 in FIG. 24 with estimated instruction types replacing estimated lengths, the description is not repeated.

Folding logic circuit 2530 can be implemented using combinatorial logic. Typically, a hardware definition language is used to generate the circuits. Table 2 uses pseudocode to illustrate the combinatorial logic of folding logic circuit 2530. In Table 2, Gx is a signal to indicate whether group x was detected. The instruction groups for Table 2 are as follows: G1 is the LV-SV group type, G2 is the OP-SV group type, G3 is the LV-OP group type, G4 is the LV-BG1 group type, G5 is the LV-BG2 group type, G6 is the LV-OP-SV group type, G7 is the LV-LV-BG2 group type, G8 is the LV-LV-OP group type, and G9 is the LV-LV-OP-SV group type.

TABLE 2

G1 = FE & (IT1 = LV) & (IT2 = SV);
G2 = FE & (IT1 = OP) & (IT2 = SV);
G3 = FE & (IT1 = LV) & (IT2 = OP) & (IT3! = SV);
G4 = FE & (IT1 = LV) & (IT2 = BG1);
G5 = FE & (IT1 = LV) & (IT2 = BG2);
G6 = FE & (IT1 = LV) & (IT2 = OP) & (IT3 = SV);
G7 = FE & (IT1 = LV) & (IT2 = LV) & (IT3 = BG2);
G8 = FE & (IT1 = LV) & (IT2 = LV) & (IT3 = OP) & (IT4! = SV);
G9 = FE & (IT1 = LV) & (IT2 = LV) & (IT3 = OP) & (IT4 = SV);
NF = !G1 & !G2 & !G3 & !G4 & !G5 & !G6 & !G7 & !G8 & !G9;
FOLD2 = G1 # G2 # G3 # G4 # G5;
FOLD3 = G6 # G7 # G8;
FOLD4 = G9;

INSTRUCTION TRAPPING AND REISSUE LOGIC

As an instruction group is being executed in an instruction pipeline, various problems can occur to prevent the instruction group from completing. For example, a LV-LV-OP group may encounter a stack cache and data cache miss, which would cause the instruction pipeline to stall. Typically, if a problem occurs while executing an instruction, the instruction is "trapped" until specialized trap logic can resolve the problem. However, conventional trap logic can only handle single instructions rather than instruction groups. Furthermore, since the instructions in the instruction groups are executed concurrently, determination of which instruction caused the problem is very difficult. Thus, an execution unit in accordance with one embodiment of the present invention uses a reissue logic, which causes the instructions of an instruction group to be re-issued individually if a problem occurs while executing the instruction group. The execution stores the state of the execution unit, e.g. the program counter, before issuing the instruction group. If a trap is detected, the reissue logic restores the state of the execution unit prior to reissuing each instruction as a separate instruction by inhibiting instruction folding. Since the instructions of the instruction group are issued individually, conventional trap logic circuits can handle the problem when the offending instruction or instructions are executed. After the instructions of the trapped group have been issued individually, instruction folding is re-enabled.

For example, if a LV-LV-OP group is trapped, the reissue logic restores the program counter to the state before the LV-LV-OP group was issued. Then, the reissue logic forces each instruction to be issued individually by inhibiting instruction folding. Thus, the first LV instruction is issued, then the next LV instruction is issued and finally the OP instruction is issued. Thus, whichever instruction caused the problem will be trapped individually and handled appropriately by the trap logic for single instructions.

Figure 28:
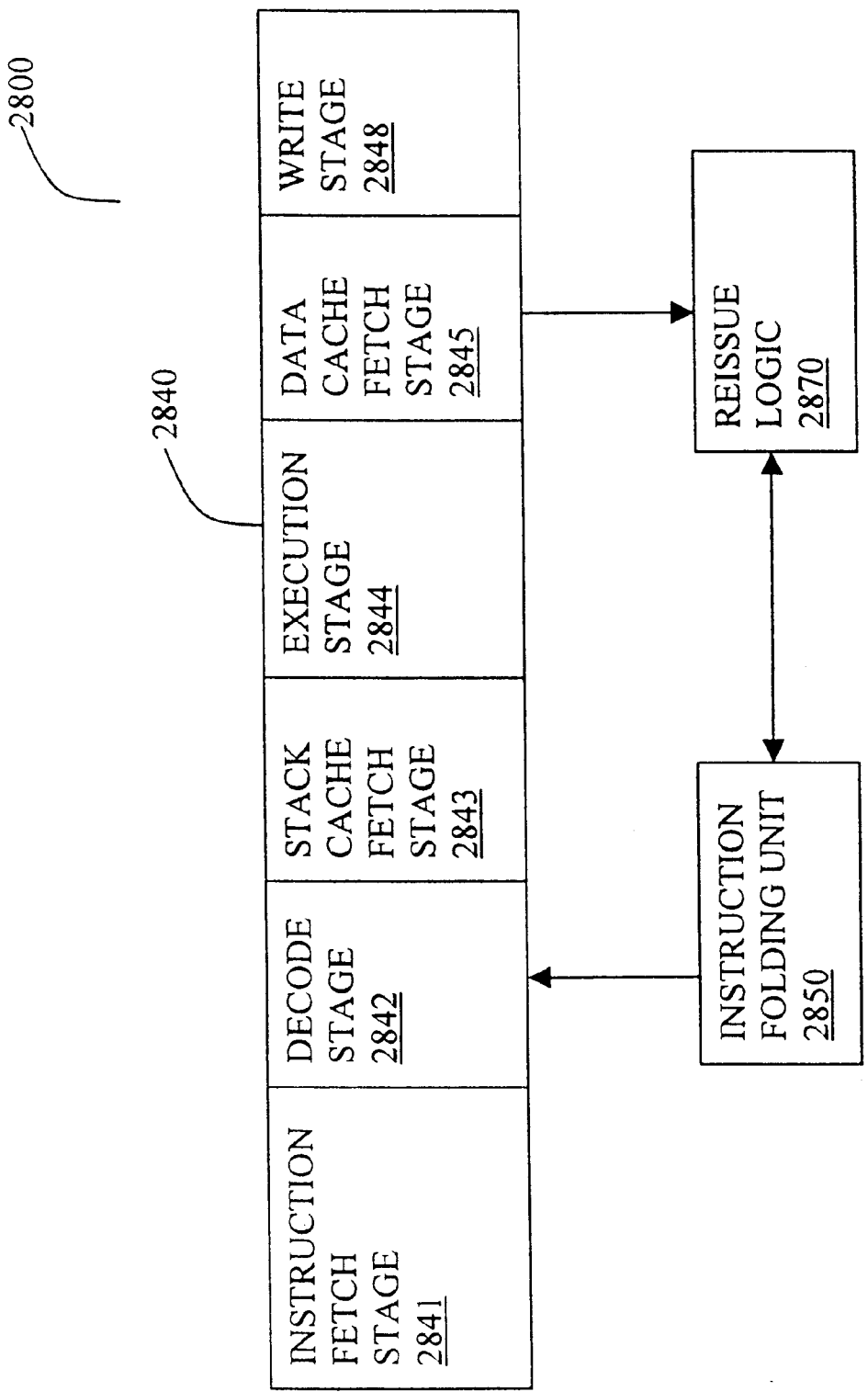
FIG. 28 is a block diagram of an instruction pipeline with an instruction-folding unit and a reissue logic in accordance with one embodiment of the present invention.

FIG. 28 illustrates an execution unit 2800, which includes reissue logic in accordance with one embodiment of the present invention. Specifically, execution unit 2800 includes an instruction pipeline 2840, an instruction-folding unit 2850, and reissue logic 2870. In some embodiments, instruction-folding unit 2850 is incorporated into a stack cache fetch stage 2842 of instruction pipeline 2840. Traps are detected in data cache state 2845 of instruction pipeline 2840. When an instruction group is trapped, data cache stage 2845 of instruction pipeline 2840 signals reissue logic 2870 to reissue the instructions of the trapped group, as explained above.

Figure 29:
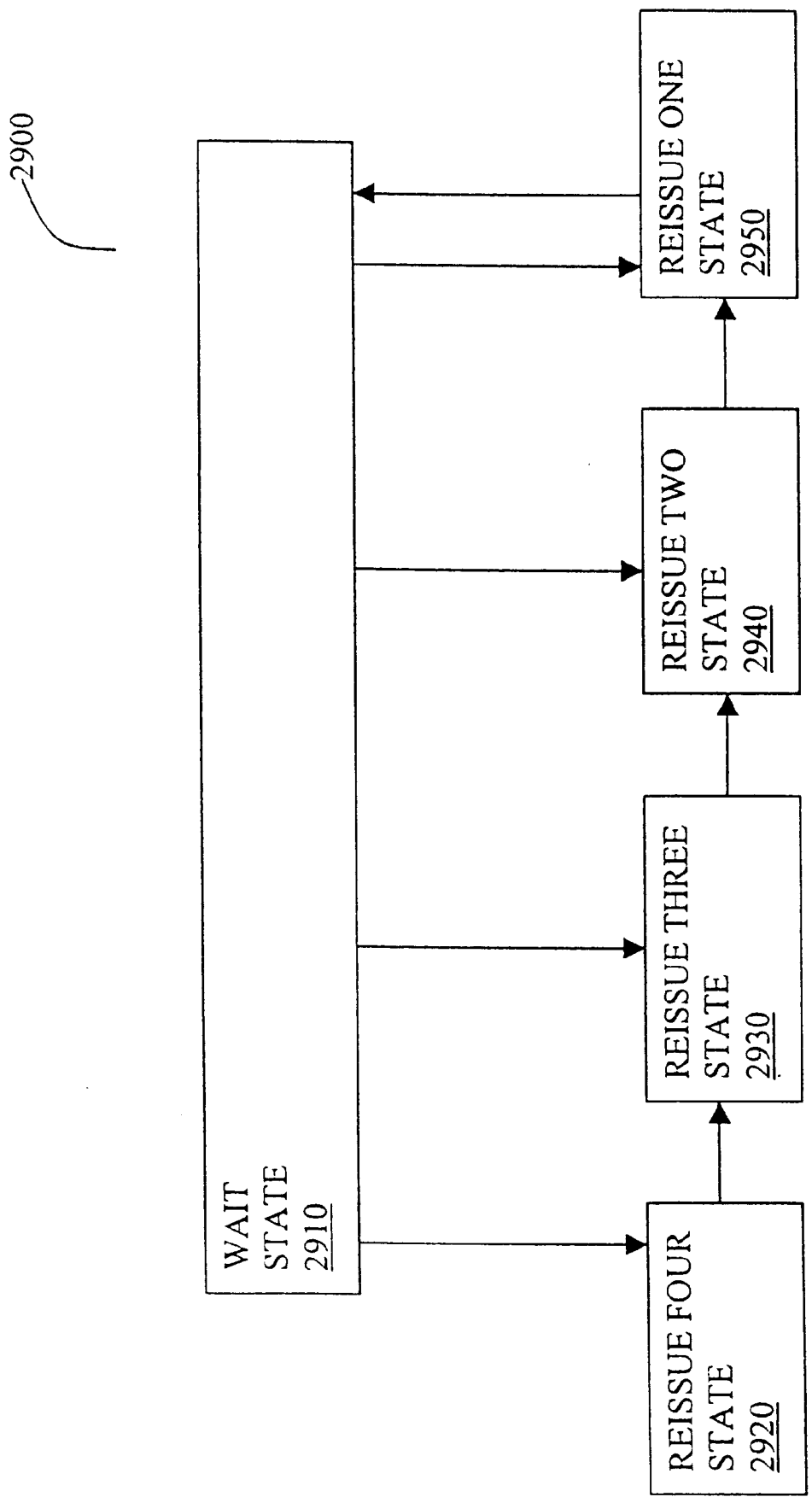
FIG. 29 is a state diagram of reissue logic in accordance with one embodiment of the present invention.

FIG. 29 illustrates the state table 2900 for one embodiment of reissue logic 2870. Upon power-on or reset, reissue logic 2870 enters wait state 2910. Reissue logic 2870 remains in wait state 2910 until write stage 2848 signals reissue logic 2870 that an instruction group trap has occurred. Reissue logic 2870 must also receive an indication of the size of the group. Signals FOLD2, FOLD3, and FOLD4, as described above, can be used for the size of the group. If a trap occurs on a four-instruction instruction group, reissue logic 2870 resets the program counter inhibits folding and transitions to a reissue four state 2920. Reissue logic 2870 can inhibit folding by pulling fold enable signal FE to an invalid state (typically logic low). Reissue logic 2870 remains in reissue four state 2920 until reissue logic 2870 receives an instruction executed signal, which indicates that an instruction has been executed. Typically, instruction-folding unit 2850 drives the instruction-executed signal to reissue logic 2870 whenever an instruction is executed. If reissue logic 2870 receives the instruction executed signal while in reissue four state 2920, reissue logic 2870 transitions to reissue three state 2930.

Reissue logic 2870 can also enter reissue three state 2930 from wait state 2910. Specifically, if a trap occurs on a three-instruction instruction group while reissue logic 2870 is in wait state 2910, reissue logic 2870 resets the program counter, inhibits folding, and transitions to a reissue three state 2930. If reissue logic 2870 receives the instruction executed signal while in reissue three state 2930, reissue logic 2870 transitions to reissue two state 2940.

Reissue logic 2870 can also enter reissue two state 2940 from wait state 2910. Specifically, if a trap occurs on a two-instruction instruction group while reissue logic 2870 is in wait state 2910, reissue logic 2870 resets the program counter, inhibits folding, and transitions to a reissue two state 2940. If reissue logic 2870 receives the instruction executed signal while in reissue two state 2940, reissue logic 2870 transitions to reissue one state 2950.

If reissue logic 2870 receives the instruction executed signal while in reissue one state 2940, reissue logic 2870 enables folding and transitions to wait state 2910. Reissue logic 2870 can enable folding by driving the fold enable signal FE to a valid state (typically logic high).

Thus, if a trap occurs on a four-instruction group, reissue logic 2870 inhibits folding until four instructions are executed. Similarly, if a trap occurs on a three-instruction group, reissue logic 2870 inhibits folding until three instructions are executed; and if a trap occurs on a two-instruction group, reissue logic 2870 inhibits folding until two instructions are executed.

In the various embodiments of this invention, methods and structures have been described that increase the performance of stack based computing systems. By using multiple caches and grouping multiple instruction for simultaneous execution, a stack based computing system in accordance with the present invention can use super-scalar and pipelining techniques to greatly improve performance. Furthermore, a novel length decoder can be used to rapidly calculate group lengths. In addition, a novel instruction reissue scheme reduces the complexity of the execution unit by allowing conventional single instruction trap logic to resolve instruction group traps.

The various embodiments of the structures and methods of this invention that are described above are illustrative only of the principles of this invention and are not intended to limit the scope of the invention to the particular embodiments described. In view of this disclosure, those skilled-in-the-art can define other instruction groups, stack cache management units, stack-based computing systems, length decoders, instruction-folding units, instruction buffers, instruction pipelines, execution units, length estimators, length selectors, state machines, reissue logic, and use these alternative features to create a method, circuit, or system according to the principles of this invention.

We claim:

1. In a stack based computing system utilizing a stack cache and a data cache, a method to handle stack cache misses, said method comprising:

requesting a first data word from said stack cache in a stack cache fetch stage of an instruction pipeline in the stack based computing system;

detecting a stack cache miss;

requesting said first data word from the data cache;

pushing a result computed using said first data word onto the stack;

comparing a memory address of said first data word with a memory address of a second data word in a data cache fetch stage;

retrieving said second data word in place of said first data word if said memory address of said first data word matches said memory address of said second data word;

comparing said memory address of said first data word with a memory address of a third data word in an execution stage of said instruction pipeline; and retrieving said third data word in place of said first data word if said memory address of said first data word matches said memory address of said third data word.

2. The method of claim 1, further comprising:

comparing said memory address of said first data word with a memory address of a fourth data word in a write stage of said instruction pipeline; and retrieving said fourth data word in place of said first data word if said memory address of said first data word matches said memory address of said fourth data word.

3. An instruction pipeline for stack based computing system utilizing a stack cache and a data cache, said instruction pipeline comprising:

a stack cache fetch stage coupled to retrieve data from said stack cache;

a data cache fetch stage coupled to retrieve data from said data cache;

a feedback path from said data cache fetch stage to said stack cache fetch stage; and an execution stage coupled to said comparator and said feedback path.

4. The instruction pipeline of claim 3, wherein said instruction pipeline further comprises a write stage coupled to said comparator and said feedback path.

5. The instruction pipeline of claim 4, wherein said comparator is configured to compare a memory address from said stack cache fetch stage with a memory address from said data cache fetch stage, a memory address from said execution stage, and a memory address from said write stage; and wherein said feedback path is configurable to transfer a data word from said data cache fetch stage, said write stage, and said execution stage to said stack cache fetch stage.

6. The instruction pipeline of claim 5, wherein said feedback path comprises a multiplexer having:

a first plurality of input terminals coupled to said execution stage;

a second plurality of input terminals coupled to said data cache fetch stage;

a third plurality of input terminals coupled to said write stage;

a plurality of configuration terminals coupled to said comparator; and a plurality of output terminals coupled to said stack cache fetch stage.

\* \* \* \* \*